United States Patent Office 3,304,404
Patented Feb. 14, 1967

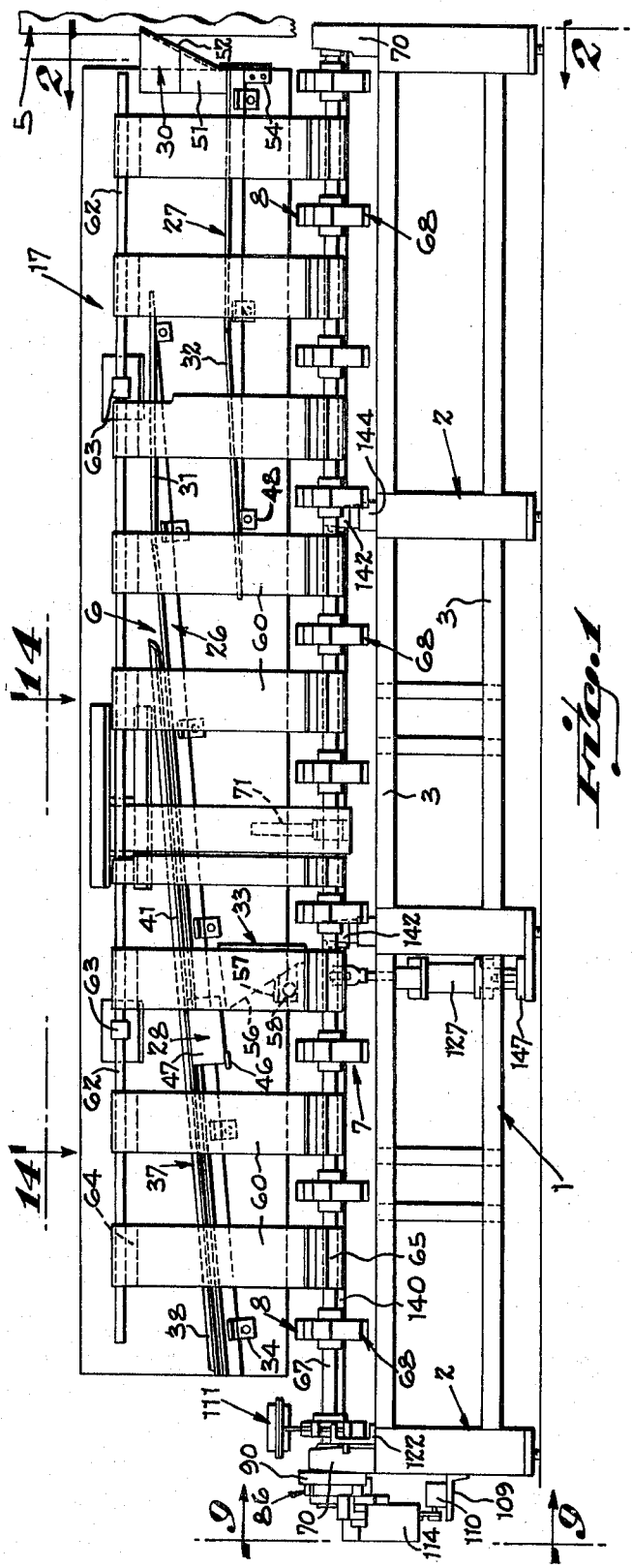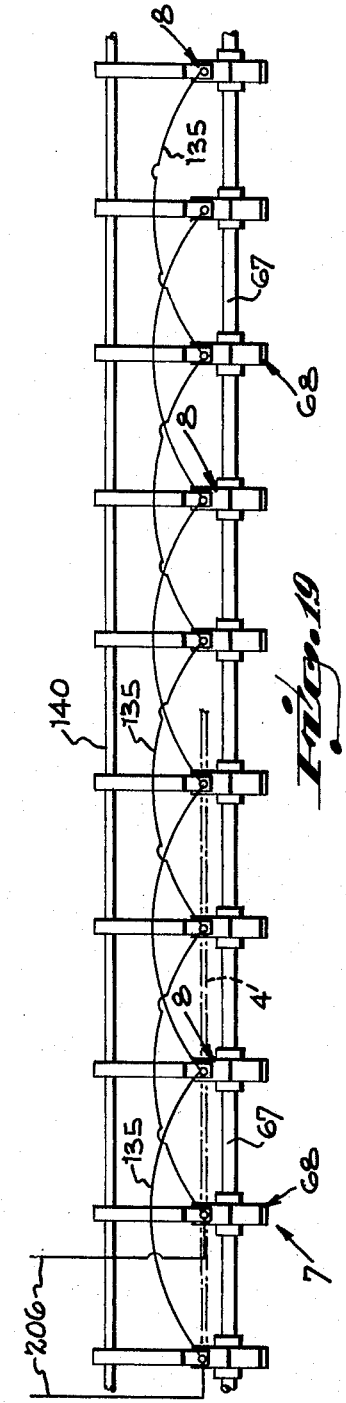

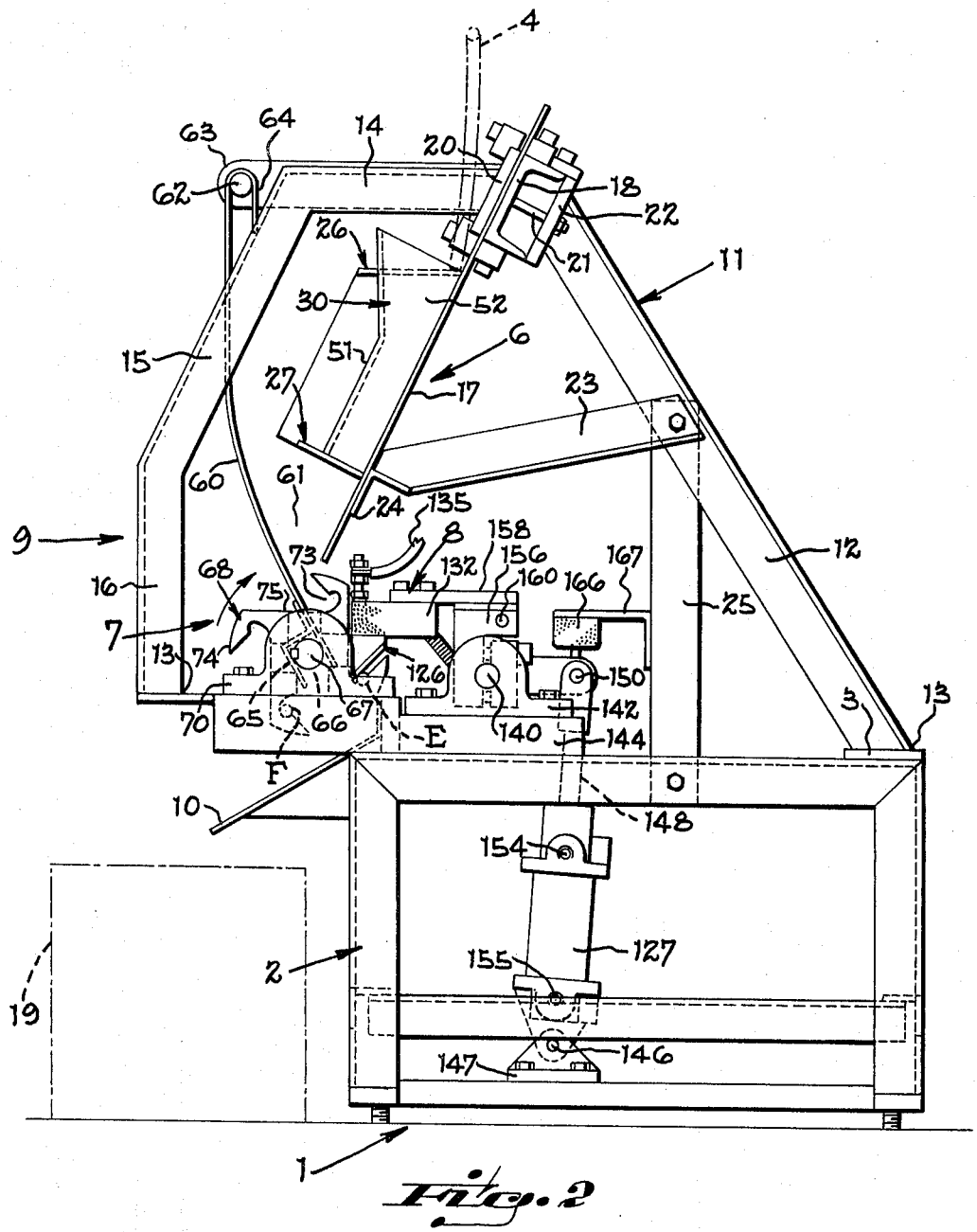

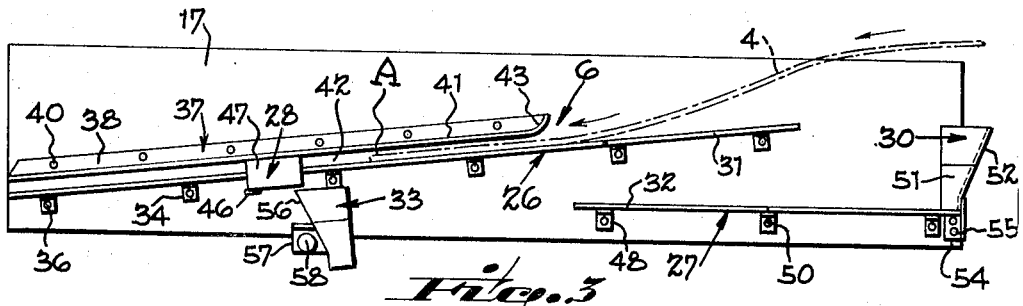
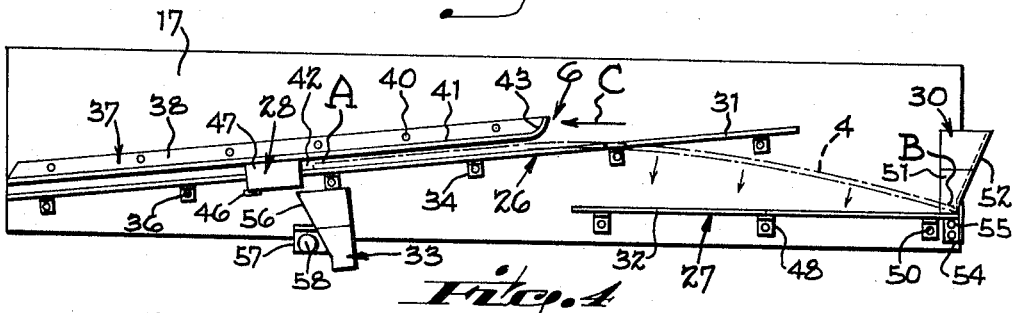
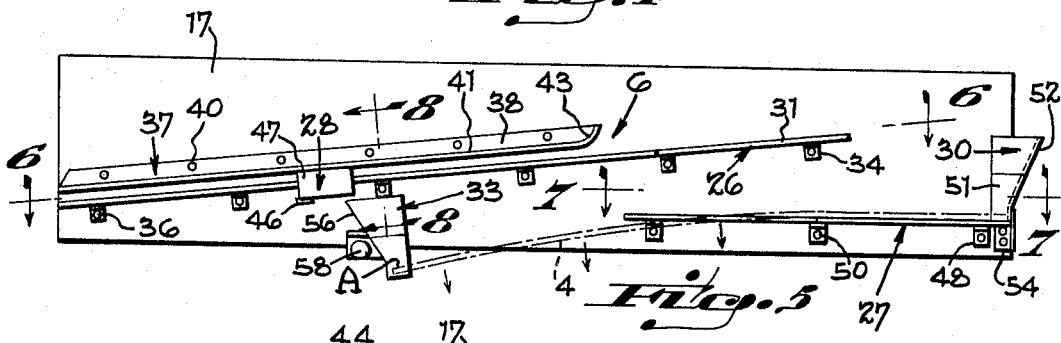
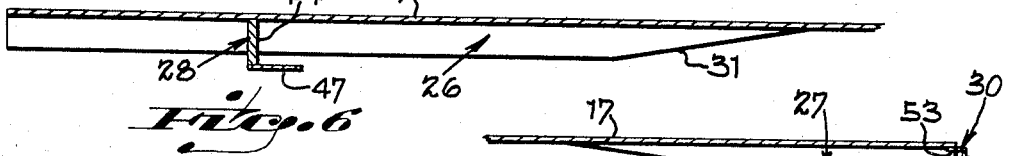
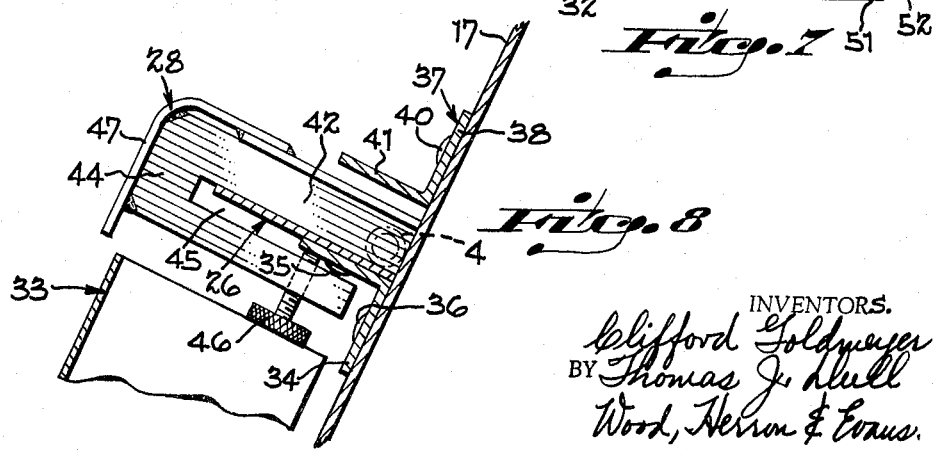
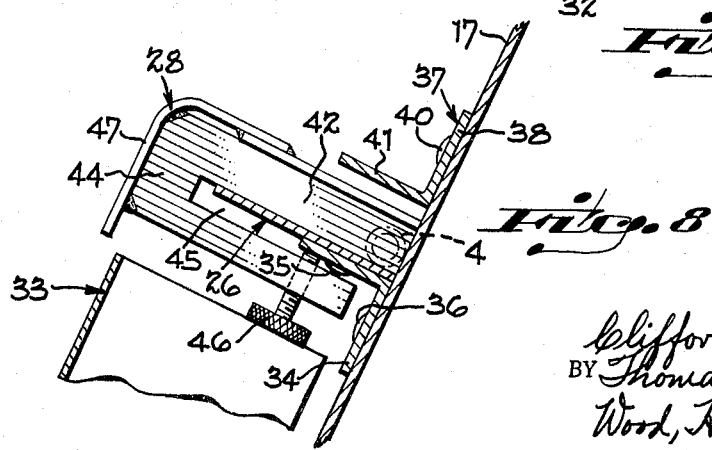

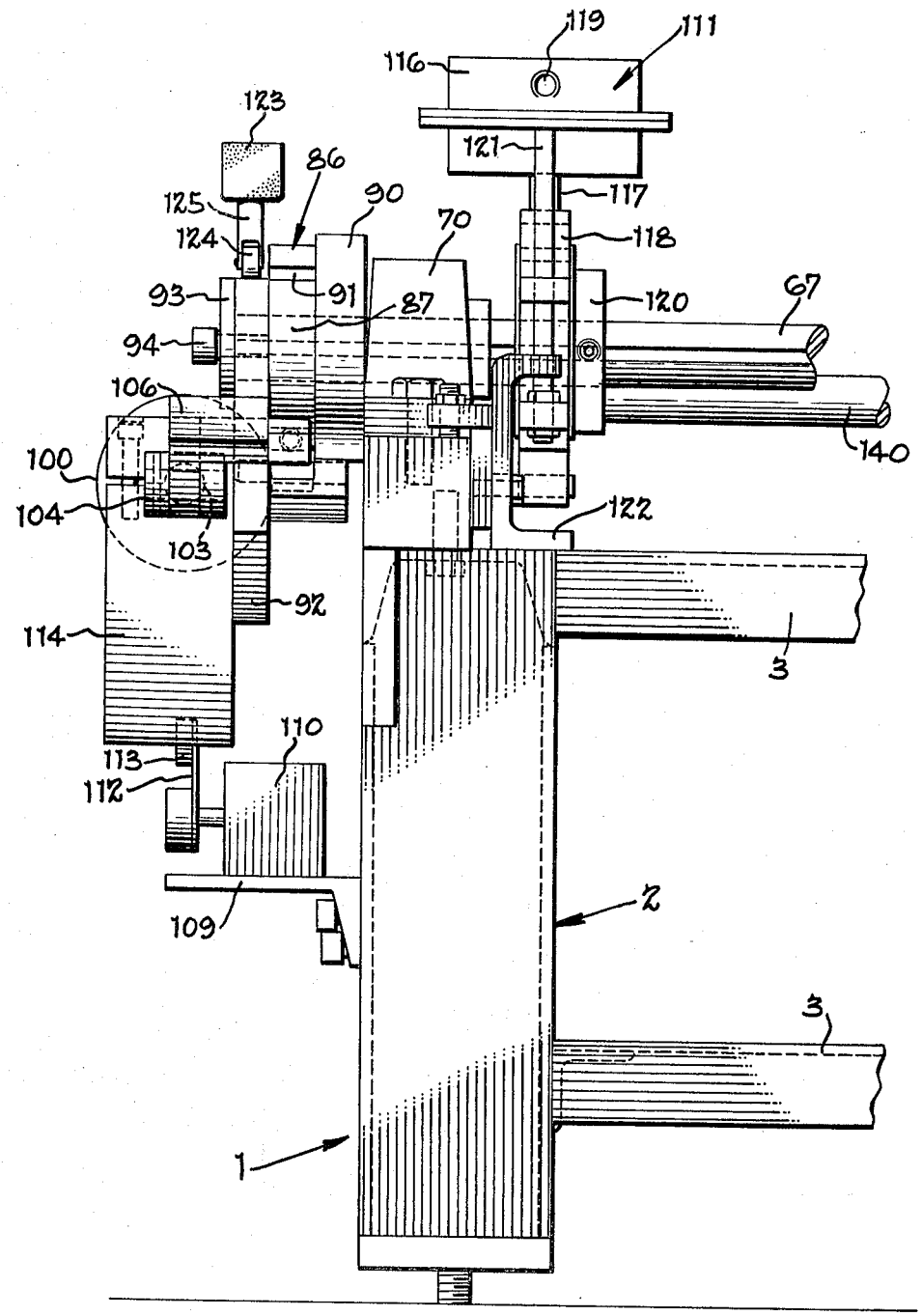

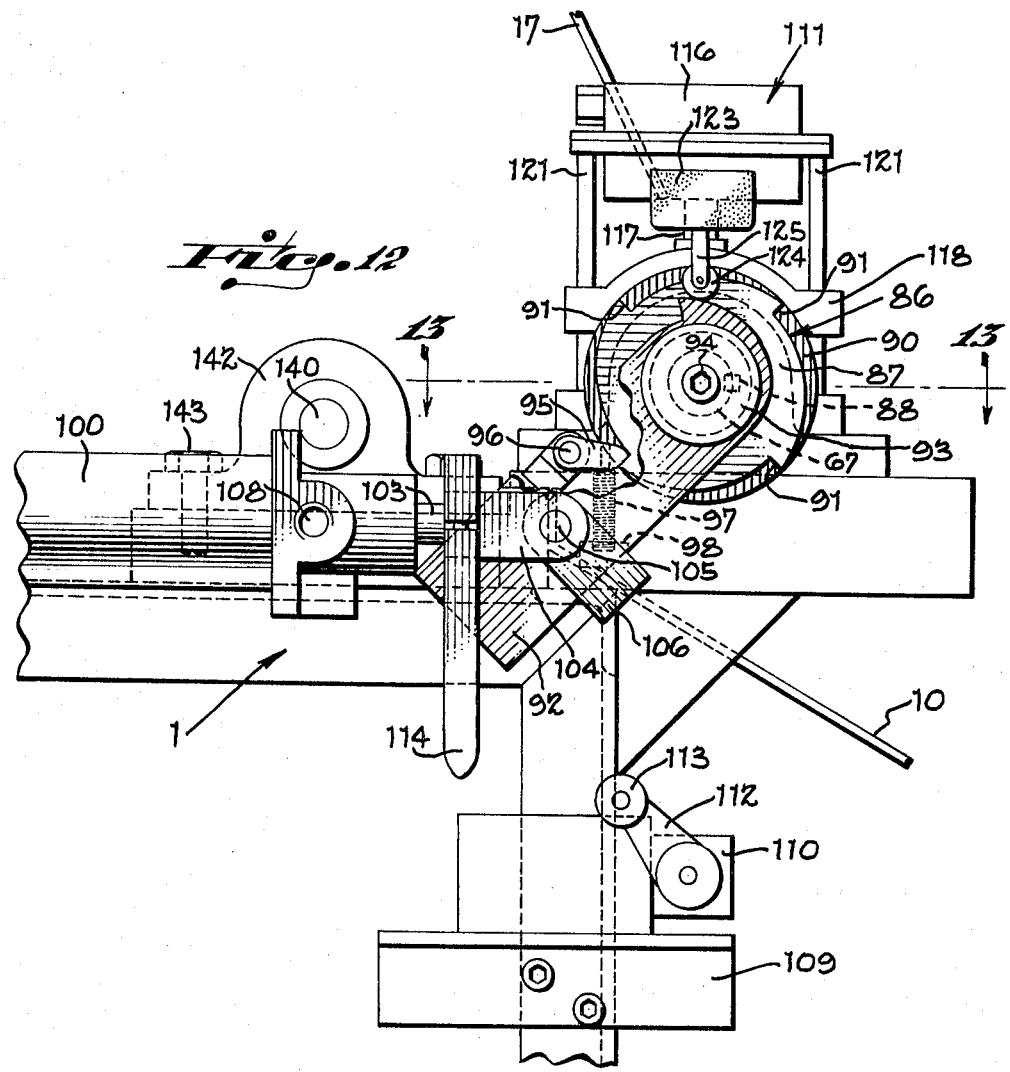
Feb. 14, 1967  C. GOLDMEYER ETAL  3,304,404
HIGH SPEED HEAT TREATING MACHINE
Filed May 14, 1964  12 Sheets-Sheet 7
INVENTORS.
Clifford Goldmeyer
Thomas J. Hall
BY Wood, Herron & Evans.
ATTORNEYS.

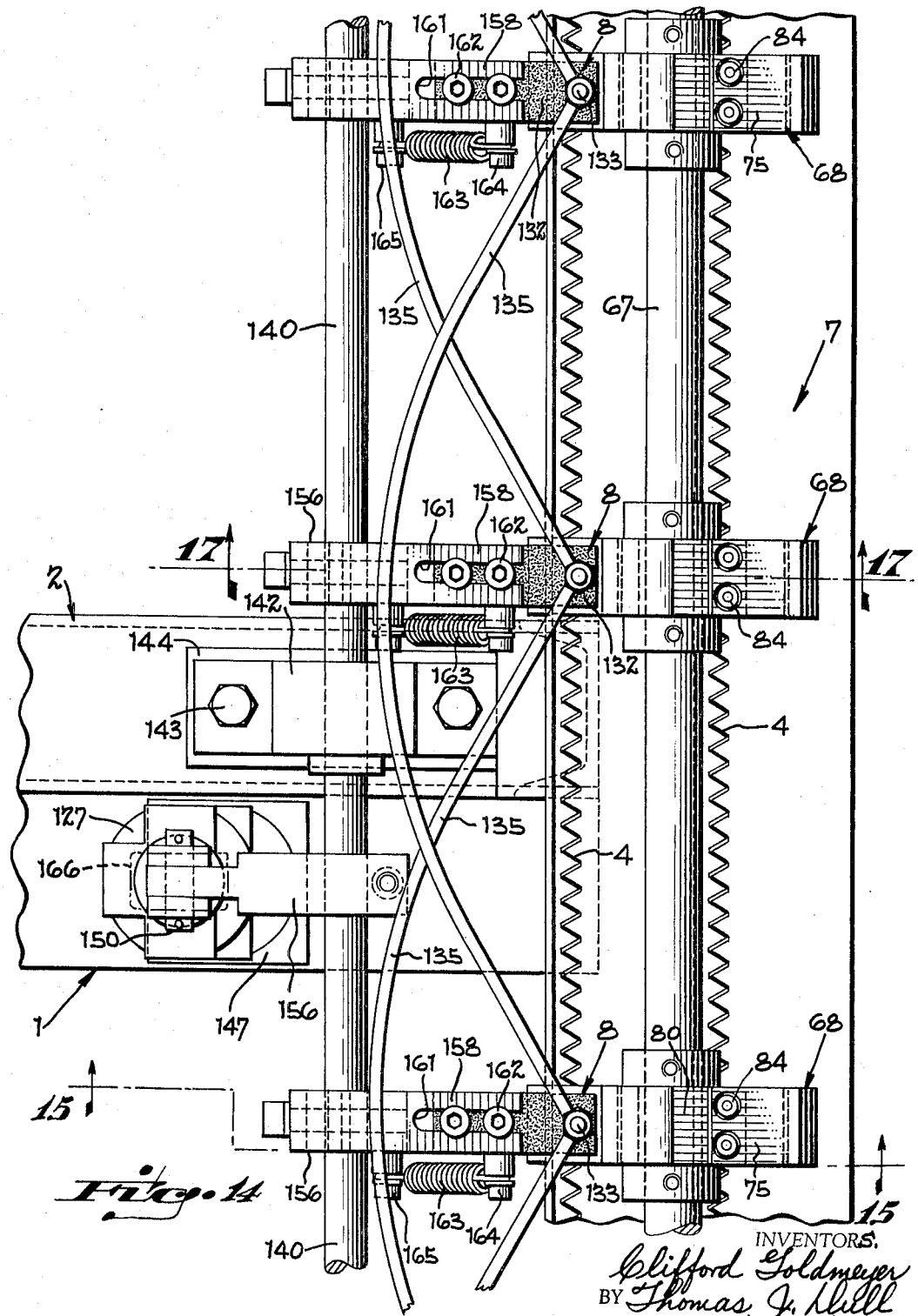

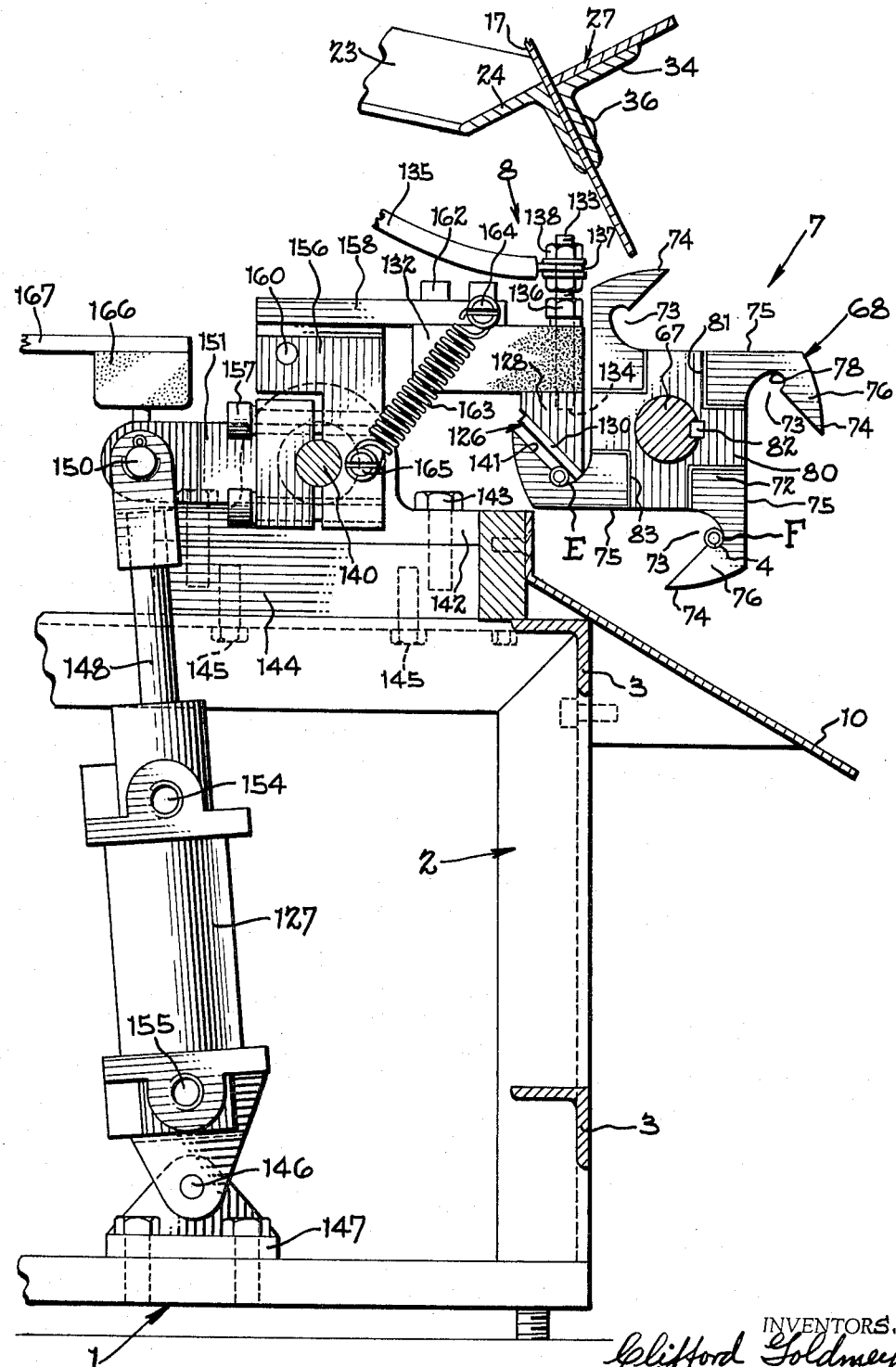

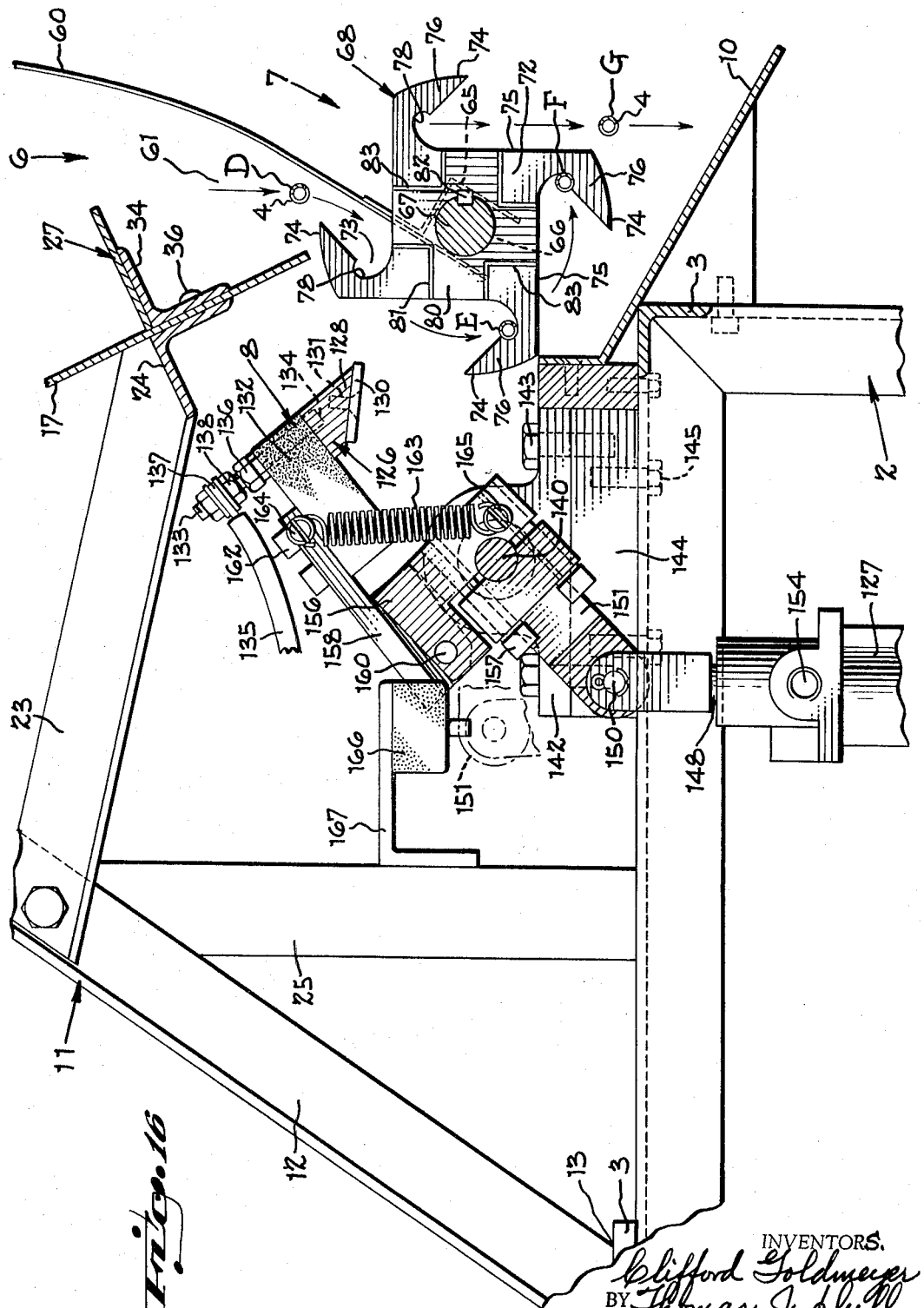

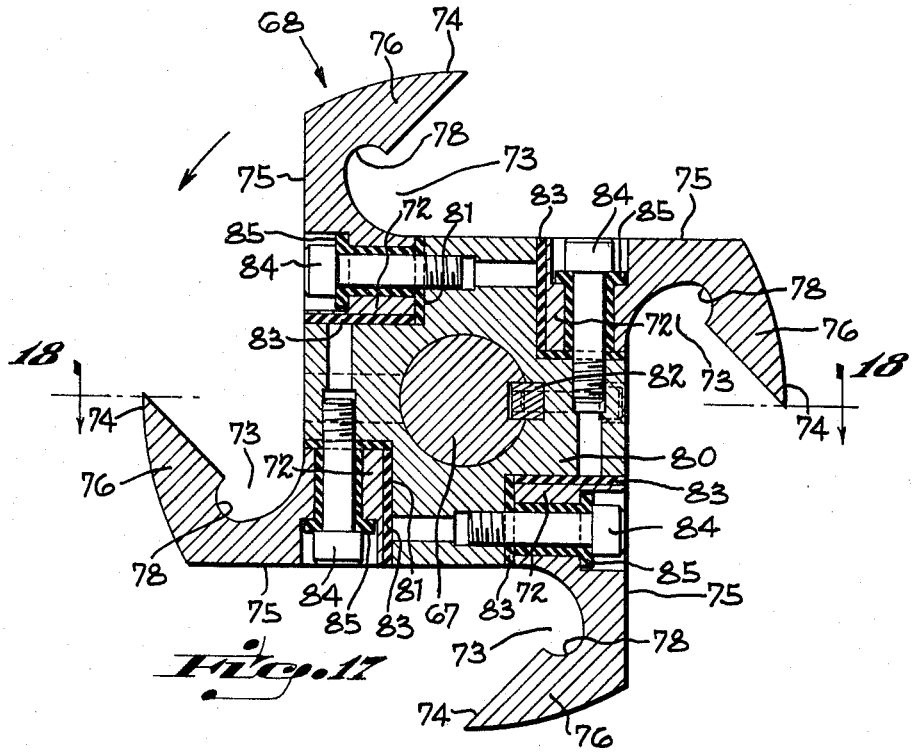
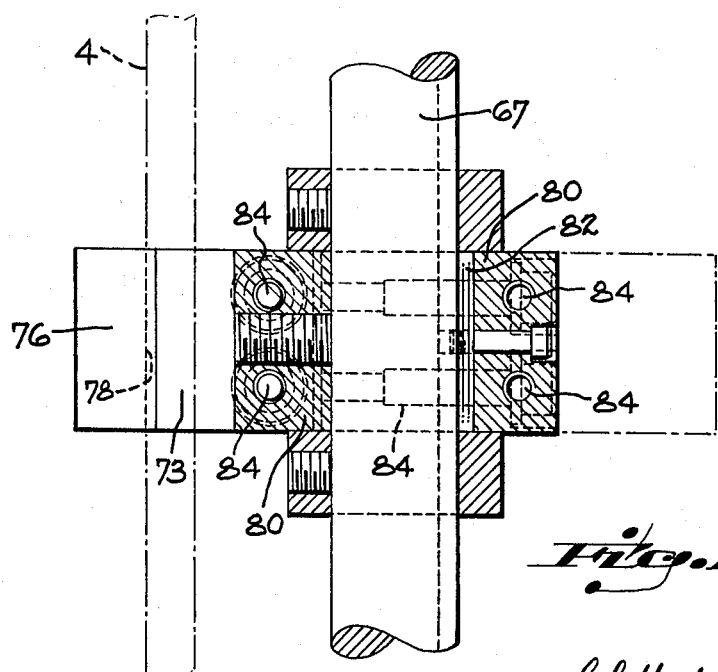

3,304,404
HIGH SPEED HEAT TREATING MACHINE
Clifford Goldmeyer, Cincinnati, and Thomas J. Dull, Fairfield, Ohio, assignors to The J. R. Greeno Company, Cincinnati, Ohio, a corporation of Ohio
Filed May 14, 1964, Ser. No. 367,538
12 Claims. (Cl. 219—156)

This invention relates to an automatic heat treating machine which is adapted to normalize helical wires and similar metallic workpieces in a rapid, automatic manner, utilizing electrical energy to bring successive workpieces to the treating temperature. The helical wires, for which the machine is particularly intended, are of the type used in the manufacture of coil spring units, such as mattresses, cushions or the like.

Generally speaking, in the manufacture of coil spring mattresses of this character, loose individual coil springs are positioned in row formation, then the helical wires are rotated and advanced by a threading operation upon mating portions of the terminal coils at top and bottom. After being threaded on in this manner, the helicals are anchored to the border wire at the top and bottom of the spring unit to prevent axial displacement. The helicals which join the mating portions of the terminal coils provide hinged connections between the adjoining rows of coil springs to make up the spring unit.

The helical wires are prefabricated from straight wire by a power-operated coiling machine of conventional design. The coiling machine is arranged to draw the wire from a reel and force it by power through a suitable forming mechanism which winds the straight wire into the form of a continuous helical. The coiling machine is also arranged to sever the helical into predetermined lengths as it is formed, the length of the helical being determined by the adjustment of a severing mechanism which form a part of the coiling machine. However, the coiling operation imparts strains to the steel wire and also makes the wire non-uniform in crystalline structure, thus detracting from the quality, and in some cases making the helical unfit for its intended use.

It has been the practise to temper or normalize the helicals at a treating temperature before they are assembled in the coil spring unit. By way of example, in the past, it has been customary to heat the helicals in batches to a temperature in the neighborhood of 500° F. in a suitable treating furnace. However, batch treating is a relatively slow operation and it does not bring about uniform results.

In order to overcome these problems, an automatic heat treating machine was developed, as disclosed in the prior patent to John R. Greeno and Thomas J. Dull, No. 3,040,167, which was issued on June 19, 1962. The machine disclosed in the patent is highly successful and utilizes the principle of applying electrical energy to the helical wires to bring them rapidly and uniformly to the normalizing temperature. In the prior machine, as disclosed in the patent, the cycles of operation of the heat treating machine are initiated in response to advancement of each helical wire from the power-operated coiling machine. When the heat treating cycle is initiated, a control circuit causes the coiling machine to sever the helical wire and to stop the coiling operation temporarily. At the end of the heat treating cycle the control circuit restarts the coiler so as to fabricate the next successive helical wire.

One of the primary objectives of the present invention has been to provide a heat treating machine which operates at a higher speed and in a more positive manner than is possible with the prior machine, thereby to increase the rate of production.

According to this aspect of the invention, the coiling machine is operated continuously so as to coil and sever a helical having a predetermined length upon each cycle of continuous operation. In order to operate the heat treating machine in time with the coiling machine, the coiling machine is provided with a switching device which sends out electrical impulses during each cycle of operation of the coiling machine. These impulses are transmitted to an electrical control circuit which regulates the operation of the heat treating machine in time with the cycles of the continuously operating coiling machine.

A further objective of the present invention has been to provide a rotary indexing mechanism which receives each helical wire and which advances the helical wire in a positive manner through an arcuate path to a heat treating station where the helical wire is heat treated by electrodes, the indexing mechanism subsequently discharging the treated helical wire in a positive manner from the machine.

In general, the indexing mechanism comprises a series of indexing wheels spaced axially apart from one another to support the helical at spaced points along its full length. Rotary indexing motion is imparted to the indexing wheels by a fluid pressure cylinder or other reciprocating power device which advances the indexing wheels in stepwise fashion so as to receive the helical, transfer it to the electrode heat treating station, and finally to discharge it, as noted above.

In order to segregate the helicals from one another as they issue from the coiling machine, the heat treating machine includes a receiving section adapted to feed the helical wires by gravity to the indexing wheels. The receiving section essentially comprises an inclined plate having deflectors, such that each helical moves by gravity down the inclined plate or chute toward the indexing wheels while the rate of descent is retarded and controlled by the baffles. In addition, the receiving section includes guide elements which engage the opposite ends of the helical wire, such that the wire is located axially in a predetermined position within the indexing mechanism, thereby to properly locate each helical wire with respect to the electrodes, as explained below.

A further objective of the invention has been to provide an arrangement whereby the indexing wheels coact with the electrodes to support the helical wire while it is clamped during the heat treating period, thus further simplifying the construction and operation of the machine.

For this purpose, each indexing wheel is provided with pockets or recesses of generally semi-circular shape to confine the helical as it is indexed. The individual electrodes are aligned with the respective indexing wheels and mounted for rocking motion about a pivotal axis spaced from the wheels.

The electrodes assume a retracted open position clear of the wheels during the rotary indexing motion of the wheels; upon completion of the indexing motion, the electrodes rock downwardly into clamping engagement with the surface of the helical wire at the points where it is confined in the pockets of the wheels. Thereafter, electrical energy is supplied to the electrodes to carry out the heat treating operation. In order to provide a good electrical contact, the electrodes spring slightly as they are forced into clamping engagement with the helicals to provide a wiping action.

After the heat treating period, the electrodes are rocked back to their open position and the wheels are indexed to discharge the treated helical wire and to present the next one to the heat treating station. In the present example, the electrodes are shifted through their rocking motion by a reciprocating power device, such as a fluid pressure cylinder which is regulated in time with the cycles of the indexing mechanism.

The various features and advantages of the invention will be more fully apparent to those skilled in the art from the following detailed description taken in conjunction with the drawings.

In the drawings:

FIGURE 1 is a front elevation showing the general arrangement of a helical heat treating machine constructed according to the principles of the present invention.

FIGURE 2 is an enlarged end elevation as viewed along the line 2—2 of FIGURE 1, further illustrating the heat treating machine.

FIGURE 3 is a diagrammatic view, generally similar to FIGURE 1, illustrating the action of the deflectors which retard and direct the untreated helical toward the heat treating station of the machine, as the untreated helical is advanced from the forming machine.

FIGURE 4 is a diagrammatic view similar to FIGURE 3, further illustrating the path of motion of the helical after it has been advanced to the heat treating machine.

FIGURE 5 is a diagrammatic view similar to FIGURE 4, illustrating the final stage of motion of the helical before reaching the heat treating station of the machine.

FIGURE 6 is a sectional view taken along line 6—6 of FIGURE 5, detailing the upper deflector which receives the helical as it issues from the forming machine for advancement to the heat treating apparatus.

FIGURE 7 is a sectional view taken along the line 7—7 of FIGURE 5, detailing the lower deflector which receives the helical from the upper deflector for advancement to the heat treating station of the machine.

FIGURE 8 is a cross sectional view taken along line 8—8 of FIGURE 5, further detailing the structure of the upper helical deflector.

FIGURE 11 is a fragmentary view taken along line 11—11 of FIGURE 9, further illustrating the indexing mechanism which feeds the helicals to the heating treating station. This view corresponds to the left hand portion of FIGURE 1 on an enlarged scale.

FIGURE 12 is a fragmentary view, similar to FIGURE 9, showing the ratchet and actuating cylinder of the indexing mechanism in its retracted or helical-receiving position.

FIGURE 13 is an enlarged fragmentary sectional view taken along line 13—13 of FIGURE 12, further detailing the relical indexing mechanism.

FIGURE 14 is an enlarged fragmentary top plan view taken along line 14—14 of FIGURE 1, detailing the electrodes of the heat treating station.

FIGURE 15 is a sectional view taken along line 15—15 of FIGURE 14, further illustrating the electrodes of the heat treating station in relation to the indexing mechanism. In this view, the electrodes are shown in the clamping position with respect to the helical.

FIGURE 16 is a view similar to FIGURE 15 showing the electrodes in the open or receiving position, and illustrating the motion of the feed mechanism in discharging the heat treated helical.

FIGURE 17 is a sectional view taken along line 17—17 of FIGURE 14, detailing one of the indexing wheels which advances the helical relative to the heat treating station.

FIGURE 18 is a sectional view taken along line 18—18 of FIGURE 17, further detailing the construction of one of the indexing wheels.

FIGURE 19 is a diagrammatic view showing the electrical power circuit of the heat treating station.

Heat treating machine generally

Figure 9:
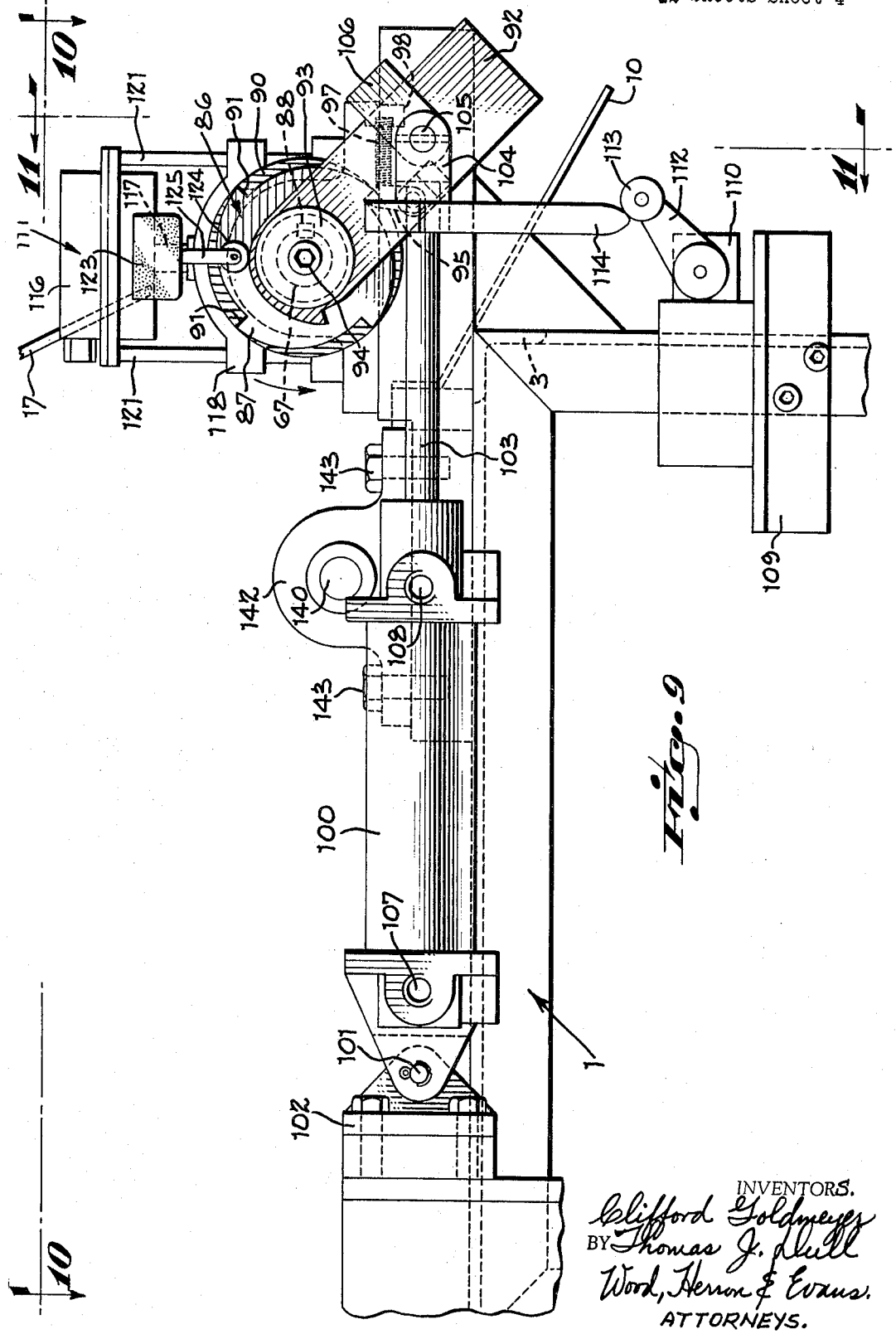
FIGURE 9 is an end elevation as viewed along the line 9—9 of FIGURE 1, illustrating the power cylinder and ratchet mechanism which operates the indexing mechanism for advancing the helical from the receiving section toward the heat treating station.

As best shown in FIGURES 1 and 2, the machine which embodies the principles of the invention comprises a composite base, indicated generally at 1, which is formed of structural steel members rigidly joined together, such as by welding. The machine has a substantial length, and in order to support the several operating components rigidly, the base 1 includes a series of box-like truss structures, indicated generally at 2, which rest upon the floor and provide vertical support for the operating components of the machine. Upper and lower horizontal stringers 3—3 extend longitudinal of the base 1 and are joined to the truss structures 2 so as to form a part of the base structure.

As indicated by the arrows in FIGURES 3–5, the helical wires 4 are advanced in corkscrew fashion from the delivery end of a conventional coiling or helical forming machine, a portion of which is indicated at 5 in FIGURE 1. In general, the coiling machine is arranged to advance a continuous length of straight wire from a suitable reel and to force it by power through a coiling mechanism which reduces the straight wire into helical form having the required pitch and outside diameter. As the helical wire 4 advances from the forming machine, its leading end passes directly into a receiving section, indicated generally at 6 (FIGURES 1–5), which forms a part of the feed mechanism of the heat treating machine, as explained later in detail.

In order to increase the speed of operation, according to the present invention, the coiling machine operates continuously and includes a cut-off mechanism (not shown), by means of which the advancing helical wire 4 is severed automatically to a predetermined length upon each cycle of operation. The coiling machine and the heat treating machine are interconnected by an electrical control system, the arrangement being such that the cycles of operation of the coiling machine (cut-off cycle) control the cycles of the heat treating machine. In other words, the two machines, by operation of the control system of the coiling machine, coact in proper sequence with one another as a single unit.

In the above-noted prior patent, the cycles of the heat treating machine are initiated in response to the advancement of each length of helical wire from the coiling machine into the heat treating machine. This intermittent operation creates a time delay, since the coiling machine necessarily is stopped each time a predetermined length of helical wire is formed and advanced into the heat treating machine. In other words, the coiling machine must be restarted after that particular length feeds from the receiving section of the heat treating machine to the reciprocating electrodes, which subsequently engage the helical and apply the electrical energy.

Briefly, the present invention contemplates the idea of a continuously operating coiling machine including means for severing the helical wires upon each cycle without stopping the machine, combined with the improved heat treating apparatus controlled electrically by the coiling machine. Thus, the operating cycles in the present organization are sustained continuously, thereby eliminating the time delay which is involved in stopping and starting the coiling machine each time a length of wire is formed and introduced into the heat treating machine.

Generally speaking, the continuously operating coiling machine includes an electrical switch device driven by the coiling machine and arranged to send electrical impulses to the heat treating machine to operate the heat treating machine in time with the coiling machine.

The coiling machine, as noted above, operates continuously at a given speed and in an automatic manner. The electrical control device essentially comprises a switch-operating, adjustable speed gear transmission unit coupled directly to the main drive shaft of the coiling machine. The speed change transmission includes a cam shaft having a plurality of cams (in the present instance two) which trip respective control switches. The speed ratio between the main shaft of the coiling machine and its self-contained helical wire cut-off mechanism may be varied to provide the required helical wire length during continuous operation of the coiling machine.

The speed ratio of the cam shaft transmission (which is in direct driving connection with the main shaft of the coiling machine) may also be varied by virtue of the speed change adjustment mechanism of the transmission. Accordingly, when the coiling machine is set up to produce helical wires, each having a predetermined length of six feet (by way of example), then the cam shaft transmission is set up to produce two electrical impulses during the creation of each predetermined length of helical wire. These impulses are transmitted to the operating components of the heat treating apparatus, such that the successive operations of the heat treating apparatus are carried out in response to the production of helical wires by the coiling machine.

A generalized diagram of the electrical control circuit, which interconnects the heat treating apparatus with the coiling machine is disclosed in the drawings. A brief description of the operation of the control circuit is included in this specification at a later point.

Speaking generally, the heat treating machine comprises the receiving section, previously indicated at 6 (FIGURES 1–5), an indexing mechanism 7, which receives the helical wire 4 from the receiving section 6, and a heat treating station 8 comprising electrodes 126 which are associated with the indexing mechanism 7. As each helical 4 is fed from the coiling machine 5 to the receiving section 6, it descends by gravity along the receiving section and drops by gravity into the indexing mechanism 7, where it rests momentarily.

The feeding motion of the helical is best shown in FIGURES 15 and 16. At the beginning of the cycle (FIGURE 16), the indexing mechanism 7 is in a stationary, helical-receiving position and the heat treating station indicated generally at 8 is also in the open, helical-receiving position. After the helical 4 reaches the indexing mechanism 7 (FIGURE 16), the electrical switching device of the coiling machine transmits a signal which causes the indexing mechanism 7 to rotate through a one-quarter turn, thus carrying the helical 4 to a position to be engaged by the electrodes 126 of the heat treating station 8 (FIGURE 15). The indexing mechanism and the heat treating station are both located at the front or operator's side of the machine, as indicated at 9 in FIGURE 2.

After the helical 4 is indexed, the shiftable electrodes 126 of the heat treating station 8 shift into clamping engagement with the helical 4 (FIGURE 15). Thereafter, electrical energy is supplied to the electrode station 8 to heat the wire to the normalizing temperature. The electrical energy is applied for a predetermined period of time in response to a control component (time delay relay), which is incorporated in the electrical control system, as explained later. After the brief heat treating period, the control system causes the electrodes 126 of the heat treating station 8 to open or retract (FIGURE 16), then the indexing mechanism 7 is rotated through a one-quarter turn to carry the heat-treated helical from the heat treating station 8 and to advance the next helical to the heat treating station.

During successive rotary indexing movements, each heat-treated helical drops from the indexing mechanism 7 to a discharge chute 10 (FIGURES 2 and 9) which leads to a storage receptacle 19 where the treated helicals are stored temporarily, subsequently to be conveyed to the spring assembly machines.

Receiving section

As shown in FIGURES 2 and 16, the receiving section 6 is supported above the base 1 by an overhead framework, indicated generally at 11. The framework 11 is generally of inverted U-shape formation as viewed from the end of the machine (FIGURE 2) and extends approximately for the full length of the machine.

Described in detail, the overhead framework 11 comprises a series of structural steel members 12, such as angle irons, having their lower ends secured by welding or the like, as indicated at 13 to one of the longitudinal stringers 3 at the rearward side of the base 1. The members 12 rise upwardly from the base at an angle toward the front, or operator's side of the machine 9, and the upper end of each member 12 is connected to a respective cross member 14. The outer end of each horizontal member 14 is connected to a structural member 15, which is inclined downwardly and outwardly. Respective vertical structural members 16 project downwardly from the members 15 and their lower ends are attached to the front of the machine (FIGURE 2).

The overhead framework 11 provides a support structure for the receiving section, previously indicated at 6. The receiving section 6 is also substantially coextensive with the base and is arranged to control in a positive manner the advancement, by gravity, of the helicals 4 from the coiling machine to the indexing mechanism 7, as noted above. Described in detail (FIGURES 1 and 2), the receiving section 6 comprises a guide plate 17, substantially coextensive with the base and supported by the overhead framework 11. For this purpose, the overhead framework includes a horizontal channel member 18 arranged to clampingly engage the upper edge of guide plate 17.

As best shown in FIGURE 2, the inclined guide plate 17 is seated against the channel member 18 and is clampingly engaged by a clamp bar 20, which is seated against guide plate 17. The bar 20 is clamped to the channel 18 by means of bolts 21 passing through the bar 20, through channel 18, and through a backing plate 22 which is seated against the rearward side of channel 18.

The lower portion of the inclined guide plate 17 is stabilized by a plurality of horizontal braces 23 which project forwardly from the structural steel members 12, with their forward ends secured as at 24 to the guide plate 17 (FIGURE 2). In order to further stiffen the overhead framework 11, there is provided a series of vertical braces 25 rising from the base 1 and connected to the structural members 12.

In order to retard and control the gravity feed of the helicals 4 as they issue from the coiling machine 5, the inclined guide plate 17 is provided with two deflectors, comprising an upper deflector indicated generally at 26 (FIGURES 1–5) and a lower deflector, indicated generally at 27. As the helical wire 4 issues from the coiling machine, as indicated by the arrows (FIGURE 3), its leading end, indicated at A is intercepted by the upper deflector 26, so as to support the helical as it advances from the coiling machine. When the helical reaches its predetermined length, it is severed by the coiling machine, as noted earlier. The severed trailing end is indicated at B in FIGURE 4. In order to locate the helical 4 axially with respect to the machine for subsequent heat treatment, there is provided an adjustable stop or bumper 28 which engages the leading end A of the helical as indicated in FIGURE 4.

As the severed end B of the helical 4 drops from the coiling machine, it is intercepted by an end guide 30 (FIGURE 4), which as explained later, includes an inclined wall engageable with the end B of the helical to shift it toward the left as indicated by the arrow C in FIGURE 4, thereby to bring the helical into a predetermined axial position with respect to the components of the coiling machine.

As the severed trailing end B of the helical drops from the coiling machine and into the end guide 30, the trailing end portion slides downwardly along the tapered end 31 (FIGURE 6) of the upper deflector 26. In other words, the trailing position B progressively slides across the tapered end 31, causing the trailing portion to drop from the deflector 26 (FIGURES 4 and 5). As the trailing portion B drops downwardly, it is intercepted by the lower deflector, previously indicated at 27.

The lower deflector 27 momentarily supports the trailing portion B, while the leading portion A progressively drops downwardly, as indicated in FIGURE 5. The lower deflector 27 is approximately one-half the length of the helical 4 and is tapered as at 32 (FIGURE 7) on an end opposite the tapered end 31 of the upper deflector 26. By virtue of this arrangement, the trailing portion B of the helical progressively rolls from the lower deflector 27, thus retarding the helical and adapting it to drop at a controlled rate into the indexing mechanism 7.

In order to more precisely align the helical axially with respect to the indexing mechanism 7, there is provided a second end guide 33, similar to guide 30, adapted to engage the leading end A of the helical as it drops from the upper deflector 26. The end guide 33 includes an inclined wall which is engageable with the leading end A of the helical so as to shift the helical toward the right, as viewed in FIGURE 5, as it drops from the upper deflector 26. The end guides 30 and 33 thus cooperate with one another in properly locating the helical 4 axially with respect to the indexing mechanism 7.

As best shown in FIGURES 3–8, the upper deflector 26 is formed of sheet metal and includes a series of mounting lugs 34 which are right angular in cross section. The lugs 34 are secured by rivets or screws 35 (FIGURE 8) to the deflector 26 and the vertical portion of each lug is secured by a screw or rivet 36 to the guide plate 17.

In order to guide the leading end portion A of the helical in a positive manner along the upper deflector 26, there is provided a guide rail 37 (FIGURES 3–8) mounted above the upper deflector 26. The guide rail 37 is generally right angular in cross section, having one flange 38 seated against the guide plate 17 and secured thereto by rivets or screws 40. The guide rail 37 includes a generally horizontal flange 41 (FIGURE 8) which is spaced upwardly above the upper deflector 26 so as to delineate a passageway 42 adapted to receive and confine the leading end portion A of the helical as it advances. The upstream end of the flange 41 is curved upwardly as at 43 (FIGURES 3–5) to provide a receiving throat for the leading end of the advancing helical.

The bumper, previously indicated at 28, comprises a block 44 (FIGURE 8) having a slot 45 interfitting the upper deflector 26. A locking screw 46 is threaded through the block and is adapted to clamp the block at a selected position along the upper deflector 26. The block includes a right angular guard 47 which is generally right angular in cross section, which is adapted to confine the leading end portion A of the helical within the passageway 42 as the severed helical rolls from the upper deflector 26 toward the end guide 33.

The lower deflector 27 is similar to the upper deflector 26 and includes a series of angle brackets 48 secured by rivets 50 to the deflector 27 and to the guide plate 17. The end guide 30, which acts upon the trailing severed end B of the helical 4, is mounted above the lower deflector 27. As shown in FIGURE 7, the end guide 30 is generally channel-shaped, including a front wall 51, an inclined end wall 52 and a rear wall 53 contiguous to the guide plate 17. The end guide 30 includes a mounting lug 54 (FIGURES 3–5) secured by rivets 55 to the inclined guide plate 17.

The opposed end guide, previously indicated at 33, is similar to the end guide 30 and includes an end wall 56 which is slanted toward the inclined end wall 52 of end guide 30. The second end guide 33 includes a clamp bracket 57 (FIGURES 3–5) embracing the lower edge portion of the inclined guide plate 17. The clamp bracket includes a clamp screw 58 adapting the end guide 33 to be located in an adjusted position along the guide plate 17.

Briefly therefore, the bumper 28 engages the leading end A of the helical after it is severed and advanced into the receiving section 6, while the inclined end walls 52 and 56 of the end guides 30 and 33 align the helical axially with respect to the indexing mechanism 7. Upon reaching the indexing mechanism 7, the helical 4 dwells momentarily, then is indexed through a circular path to the heat treating station, as explained below.

In order to feed the helicals progressively in a positive manner into the indexing mechanism 7, there is provided a series of curved, generally vertical guards 60 (FIGURES 1 and 2), also supported by the overhead framework 11. The guards 60 coact with the inclined guide plate 17 (FIGURE 2) to delineate a downwardly converging throat 61 (FIGURES 2 and 16) leading directly into the indexing mechanism 7. Briefly therefore, the end guides 30 and 33 and the upper and lower deflectors 26 and 27 all cooperate with one another to feed each helical progressively at a controlled speed by gravity into axial alignment with the indexing mechanism 7 for subsequent advancement into the heat treating station 8.

As best shown in FIGURES 1 and 2, the guards 60 comprise respective sheet metal plates suspended from a longitudinal shaft 62 which is supported along an axis parallel with the upper portion of the inclined guide plate 17 and spaced outwardly therefrom. For this purpose, the overhead framework 11 includes a series of mounting brackets 63 (FIGURES 1 and 2) attached to the overhead framework 11 and projecting outwardly toward the front or operator's side 9 of the machine. The upper end of each guard 60 is bent to a U-shape configuration 64, which embraces the shaft 62. The lower end portion of each guard 60 includes an angle bracket 65 (FIGURES 1 and 2) which delineates a channel 66 embracing the shaft 67. Shaft 67 forms a part of the indexing mechanism 7, as explained in detail later.

*Indexing mechanism*

As noted above, the indexing mechanism 7 receives each helical 4 after it is severed and progressively fed by gravity along the receiving section 6. The indexing mechanism 7, in turn, carries the helical 4 through a circular path, in stepwise progression, to the heat treating station 8. The intermittent advancement of the indexing mechanism is controlled by the electrical switch device of the coiling machine which sends an electrical impulse into the control system in time with the fabrication and cut-off of each predetermined length of helical wire. In response to the indexing motion (initiated by the coiling machine) the jaws or electrodes 126 of the heat treating station 8 are caused to close upon the indexed helical after it advances into the indexing mechanism 7.

After the jaws 126 (electrodes) of the heat treating station engage the helical (which is still resting within the rotary indexing mechanism 7), electrical energy is supplied to the jaws, thereby to heat the helical 4 to the normalizing temperature. After this operation, the jaws 126 of the heat treating station 8 are opened, then the rotary indexing mechanism carries the heat treated helical toward the discharge chute, previously indicated at 10. The sequence of operation of the indexing mechanism 7 and heat treating station 8 is disclosed later with reference to the electrical control system illustrated in FIGURES 20 and 21.

Described in detail (FIGURES 1 and 15–18) the indexing mechanism 7 comprises a series of rotary indexing wheels 68 keyed to the indexing shaft 67 in axially spaced relationship to one another. The indexing shaft 67 is journalled at opposite ends within bearings 70—70 mounted at opposite ends of the base 1 and in an intermediate bearing 71 which depends from overhead framework 12.

As shown in FIGURE 1, the indexing wheels 68 are located between the guards 60 and each wheel 68 comprises a set of four radial arms 72 located at 90° about the axis of the shaft 67 (FIGURES 16 and 17). As shown in these views, the helical 4 is directed by the guide plate 17 and guards 60 (throat 61) in a positive manner into the retaining pockets 73 which form a part of the wheel 68. The several indexing wheels 68 are aligned with one another to delineate the retaining pockets 73 for the full length of the machine. As best shown in FIGURES 16 and 17, each helical retaining pocket 73 is delineated by a pointed spur 74 having a portion 75 generally tangent to the axis of shaft 67 and having an outer portion 76 which is disposed generally at right angles to the tangential portion 75.

The trailing side of each spur 74 (in the direction of rotation of the indexing wheel) includes a recess 78, which receives and confines the helical 4 as the helical is indexed from the receiving throat 61 to the heat treating station 8. Thus as shown in FIGURE 16, the helical D is shown dropping down through the throat 61, while the previously severed helical E, which nests in the retaining pockets 73 of the index wheels 68, will have been indexed to a position to be engaged by the clamping jaws of the heat treating station 8 (FIGURE 15). The jaws or electrodes of the heat treating station 8 assume the open position (FIGURE 16) during the indexing motion and are shifted to the closed position (FIGURE 15) into engagement with the helical E at completion of the indexing motion, as explained later.

Described in detail (FIGURES 15-18), each indexing wheel 68 comprises a mounting block 80 which is generally cross-shaped providing four right angular recesses 81 for the reception of the arms 72 of the indexing wheels. Each mounting block 80 is keyed as at 82 to the indexing shaft 67. In order to insulate the indexing wheels 68 electrically with respect to the machine (for operation of the electrical heat treating station 8, as explained later), each right angular recess includes dielectric pieces 83—83, upon which the arm 72 is seated. Each arm 72 is secured to the mounting block 80 by screws 84—84 (FIGURE 17). A bushing 85, formed of dielectric material, is interposed between each screw 84 and the arm 72 to insulate the screws from the arm.

The indexing shaft 67 and indexing wheels 68 are indexed through one-quarter turn during each cycle of operation by a ratchet mechanism, indicated generally at 86 (FIGURE 1). As shown in FIGURE 1, the indexing shaft 67 projects outwardly from the left hand bearing 70 and the ratchet mechanism 86 is mounted upon the projecting end portion of the shaft beyond the bearing 70.

Described in detail (FIGURES 9–13), the ratchet mechanism 86 comprises a ratchet wheel 87 keyed as at 88 to the indexing shaft 67, a spacer 90 being interposed between the bearing 70 and the ratchet wheel 87. The ratchet wheel is provided with a set of four teeth 91 (FIGURES 9 and 12) to advance the four indexing arms 72 through one-quarter turn upon each indexing cycle.

The ratchet wheel 87 is advanced in stepwise fashion by a swinging lever 92 which is pivotally mounted upon the projecting end portion of the indexing shaft 67 (FIGURES 9–13). The lever 92 is held in place upon the end portion of shaft 67 by a washer 93 which is secured by a screw 94 threaded into the end of shaft 67. A pawl 95 (FIGURE 12) is pivotally connected as at 96 to the lever 92 and is yieldably urged against the periphery of the ratchet wheel 87 by compression spring 97. The opposite end of the spring 97 is seated against a lug 98 forming a part of the swinging lever 92.

As noted earlier, the indexing mechanism 7 is advanced in stepwise fashion (one-quarter turn) upon each cycle of operation, the indexing cycles being controlled by the coiling machine. The indexing motion is transmitted to the swinging lever 92, in the present example, by a horizontal air cylinder 100 (FIGURE 9). Cylinder 100 is pivotally connected as at 101 to a bracket 102 which is secured to the base 1. Cylinder 100 includes a piston rod 103, the outer end of the piston rod having a clevis 104 pivotally connected as at 105 to an angular lug 106 which is attached to the lever 92. Air pressure is admitted and exhausted alternately with respect to the opposite ends of cylinder 100 (ports 107 and 108) in response to an electrically operated valve. The valve, in turn, is operated by the coiling machine, as described later with reference to FIGURES 20 and 21, which disclose the electrical control system.

The indexing mechanism 7 normally resides in the position shown in FIGURE 12, with the piston rod 103 in its retracted position. This position corresponds to the position assumed by the indexing wheels 68 shown in FIGURE 16, in which the newly-formed helical D is fed into the retaining pockets 73 to be indexed. After formation of the helical D, there is provided a short time delay, then the switching apparatus of the coiling machine transmits a signal, causing the electrical control system to admit air pressure to the port 107 (FIGURE 9) of cylinder 100. This causes the piston rod 103 to advance to the position of FIGURE 9, whereby the pawl 95 (which is engaged with one of the teeth 91 of ratchet wheel 87) rotates the ratchet wheel 87 through its one-quarter turn. Upon completion of the indexing stroke (FIGURE 9), the piston rod is retracted back to the position of FIGURE 12, ready for the next indexing cycle.

As the piston rod 103 shifts from the retracted position of FIGURE 12 to the indexing position of FIGURE 9, a trip bar 114, which depends from the piston rod 103, engages the roller 113 of a switch arm 112, thereby to close a control switch 110. Switch 110 controls the operation of a brake 111 (FIGURES 9 and 12). The brake 111 operates to clamp the indexing shaft 67 in its indexed position when the piston rod 103 reaches its fully extended position of FIGURE 9. This prevents any reverse rotation when the piston rod 103 retracts back from the position of FIGURE 9 to the position of FIGURE 12. Brake 111 also locks shaft 67 against rotation in response to the pressure of the electrodes when they engage the helical E (FIGURE 15) during the heat treating cycle.

Switch 110 is mounted upon a bracket 109 attached to the base 1. The switch arm 112 is normally spring-biased to its open position (FIGURE 12), with the air-operated brake 111 in its inactive or brake release position. When the switch arm 112 is shifted to the position shown in FIGURE 12 (with the shaft 67 rotated to the next indexing position), the arm 112 of switch 110 is shifted to its closed position. In the tripped position of switch 110 (FIGURE 12) the electrical control system supplies air pressure to the port 119 of brake 111 to apply braking pressure to indexing shaft 67, thereby to hold the shaft and the indexing wheels 68 in the indexed position.

Figure 10:
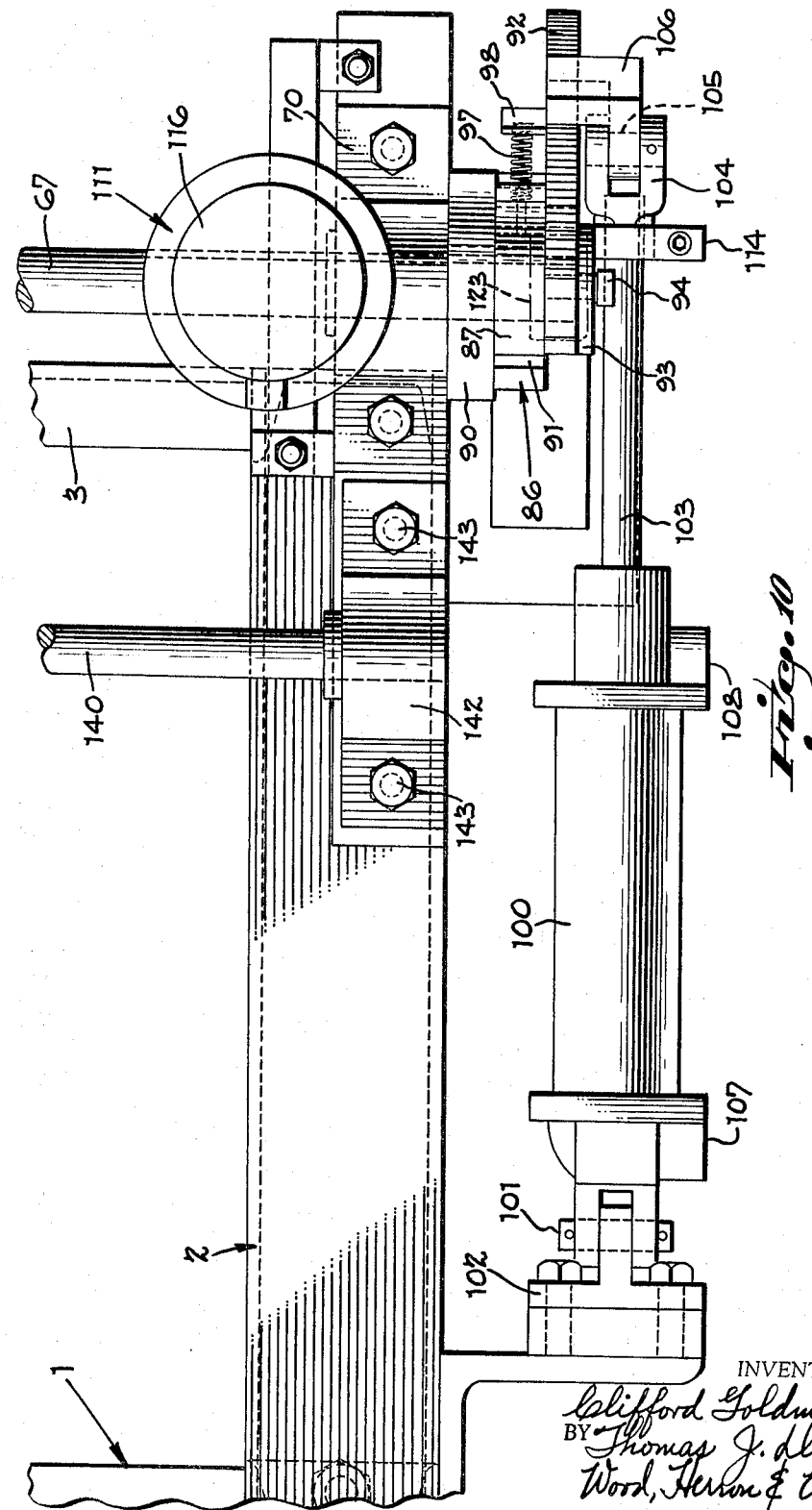
FIGURE 10 is a fragmentary top plan view of the indexing mechanism, as taken along the line 10—10 of FIGURE 9.

As best shown in FIGURES 9–11, brake 111 is of the diaphragm type comprising a chamber 116 having an internal diaphram (not shown) connected by an actuating rod 117 to a brake shoe 118. The brake shoe 118 acts upon a brake drum 120 which is keyed to the indexing shaft 67. The chamber 116 is supported by a pair of vertical rods 121—121 rising from a mounting bracket 122 which is secured to the top of the base 1. Brake shoe 118 is slidably mounted upon the vertical rods 121, whereby the rods resist the torque force of the indexing shaft 67 when the brake is applied.

The actuating rod 117 of the brake chamber 116 normally is spring-biased upwardly to hold the brake shoe 118 in its disengaged position. Air pressure is admitted to the upper portion of the chamber 116 by way of a conduit leading to the port 119 (FIGURE 11), the admission of the air being controlled by an electrically operated valve as explained later with reference to the electrical control circuit.

When the swinging lever 92 reaches the indexed position of FIGURES 9 and 16 (with the newly-formed helical E presented to the heat treating station 8), the lever 92 trips a switch 123. As described later with reference to the electrical circuit, switch 123 controls the application of electrical energy to the heat treating station 8, the electrodes or jaws of which will have been closed into clamping engagement with the helical E (FIGURE 15) at this stage of operation.

In order to operate the heat treating control switch 123, the upper end of the swinging lever 92 (or an element mounted on the lever) is provided with a cam element 124 (FIGURES 9 and 12) which rises in a path generally tangent to the axis of rotation of the indexing shaft 67. The switch 123 includes a plunger 125 tracking upon the surface of cam 124 and arranged to close the switch contacts when the swinging lever 92 reaches the indexed position of FIGURE 12.

*Heat treating station*

As noted above, upon completion of the indexing cycle, the newly-formed helical E (FIGURE 16) is presented to the heat treating station 8 to be engaged by the electrodes 126. The electrodes 126 are shown in the open, helical-receiving position in FIGURE 16 and are shown in the helical clamping position in FIGURE 15. The electrodes 126 are shifted to the clamping position by a vertical air cylinder 127, which is activated by the control system, as explained later. As shown in FIGURES 14–16, the electrodes 126 are mounted in alignment with the respective indexing wheels 68, the arrangement being such that the indexing wheels (which are electrically insulated as described earlier) coact with the electrodes 126 in clampingly engaging the helical 4 at spaced points during the heat treating cycle.

Briefly, the electrodes 126 reside in the retracted or helical-receiving position (FIGURE 16) as the helical E is indexed to the heat treating position. After the indexing motion, the electrodes 126 shift to the advanced position in FIGURE 15 and act as jaws to clampingly engage the helical E at spaced points with respect to the indexing wheels 68. It will be understood at this point, that an electrical power circuit interconnects the respective electrodes 126 in pairs, as explained later, such that the heating circuit is completed through the helical between the individual electrodes 126.

Described in detail (FIGURES 14–16) each electrode 126 comprises a block 128, formed of metal and having an angulated face and a contact pad 130 secured by one or more screws 131 to the block 128. Each block 128 is mounted upon a bar 132 which is formed of electrical insulating material. The metal block 128 is secured to the bar 132 by a stud 133 passing through the bar 132 and having an end 134 threaded into the metal block 128. Each stud 133 constitutes an electrical terminal adapted to transmit electrical energy by way of its cable 135. The stud 133 includes a clamping nut 136 bearing against the bar 132 to hold the metal block 128 firmly in place with respect to the insulating bar 132. The electrical cable 135 includes a connector 137 interfitting the stud 133 and clamped in place by the nuts 138—138.

The electrode assembly, comprising the block 128, contact pad 130 and insulating bar 132, is mounted upon a shaft 140 for rocking motion from the position of FIGURE 16 to the position of FIGURE 15. In order to provide a wiping contact with the helical E, each electrode assembly is mounted for sliding motion, with respect to the helical as it is rocked to its clamped position, shown in FIGURE 15. It will be noted (FIGURE 15) that the spur 74 presents an angulated face 141 and that the contact pad 130 is similarly angulated to reside in parallelism with the face 141 when the electrode assembly is shifted to its clamping position. As noted earlier, the helical E is confined in the retaining pocket 73 as it is clampingly engaged by the electrode assembly.

As best shown in FIGURES 2, 14–16, the rock shaft 140 is rotatably mounted in a series of pillow blocks 142 which are secured by screws 143 to respective spacer blocks 144. The spacer blocks, in turn, are secured to the base 1 by screws 145. The bearings or pillow blocks are spaced along the base 1 in order to properly stabilize the rock shaft, thereby to prevent springing of the shaft under the clamping pressure which is imposed upon it.

As noted above, the rock shaft is actuated by the vertical air cylinder 127 which is pivoted as at 146 to a bracket 147 attached to the base 1 (FIGURE 15). The cylinder 127 includes a piston rod 148 which is pivotally connected as at 150 to an actuating lever 151. The actuating lever 151 is keyed to the rock shaft 140, such that, upon movement of the piston from the position of FIGURE 16 to the position of FIGURE 15, the electrode assemblies are shifted from the retracted to the clamping position. Air pressure is admitted and exhausted with respect to piston 127 by means of conduits which are connected to the ports 154 and 155 (FIGURE 15), as explained later.

Each electrode assembly 126 is clampingly secured to the rock shaft 140 by a respective clamping block 156 (FIGURES 14–16) which is of split construction and arranged to embrace the rock shaft 140. The clamping block 156 is locked in pressure engagement with the rock shaft 140 by means of clamp screws 157—157. Each electrode assembly 126 is connected to its clamping block 156 by an arm 158 which is pivotally connected as at 160 to the clamp block assembly 156.

As shown in FIGURE 14, each arm 158 is slotted as at 161. The insulating bar 132 is adjustably secured to the arm 158 by screws 162 which pass through the arm 158 into threaded engagement with the block 132. A tension spring 163 has its opposite ends anchored as at 164 and 165 to the clamping block 156 and actuating arm 158. This spring 163 thus adapts the electrode assembly 126 to swing about pivot 160 from the position of FIGURE 16 to the position of FIGURE 15 to provide the wiping action with respect to the helical E as the electrode assembly is shifted to its closed position, as noted above.

As best shown in FIGURES 2, 15 and 16, there is provided a limit switch 166 which is mounted upon a bracket 167 above the piston rod 148. The switch 166 is closed when the piston rod 148 reaches its fully extended position. Switch 166 is interconnected in the control circuit and adapted to initiate the indexing motion, as explained with reference to the electrical control circuit.

*Operation*

Figure 21:
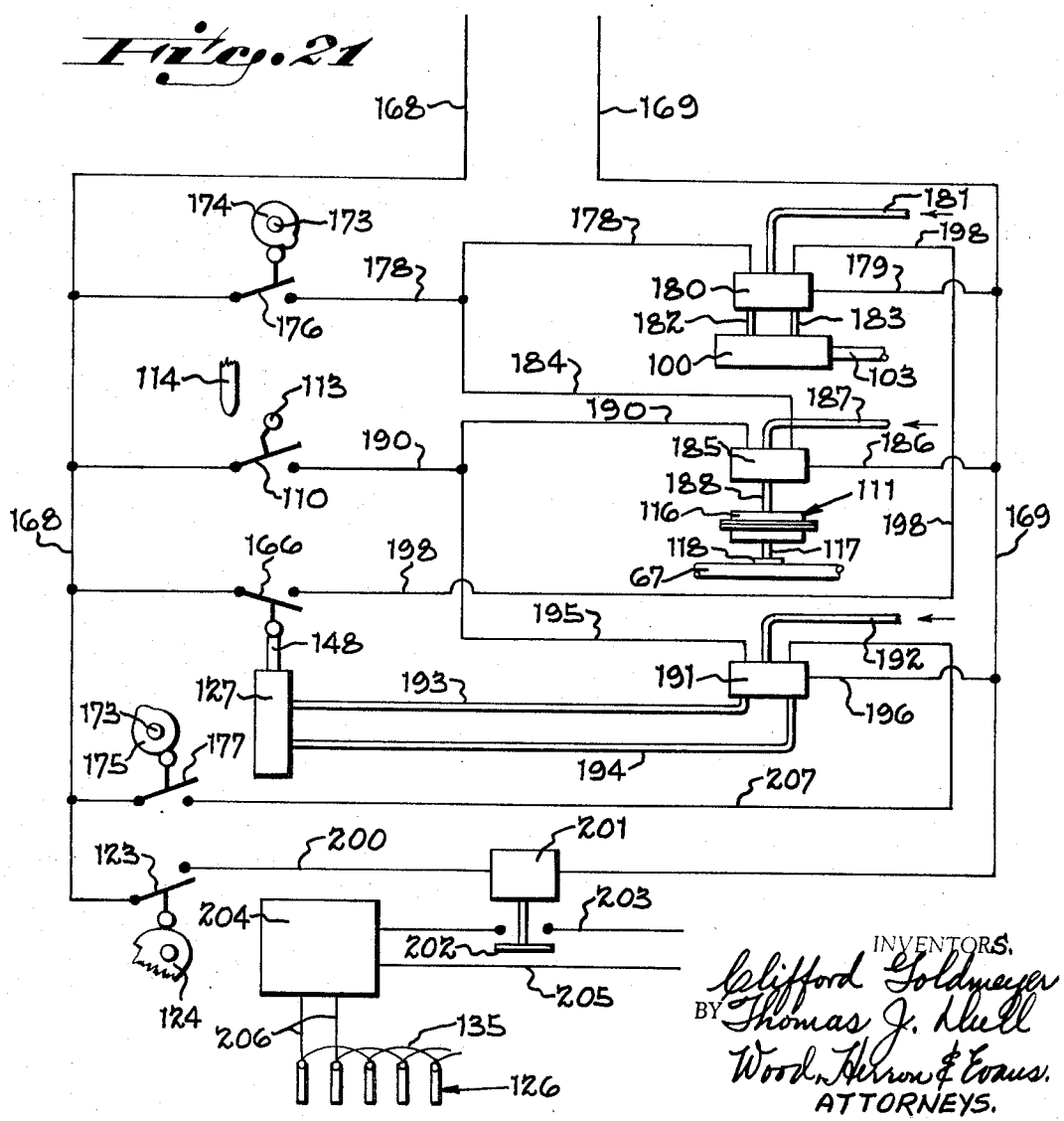
FIGURE 21 is a diagrammatic view showing the electrical control circuit of the heat treating machine.

FIGURE 21 illustrates in a general way, an electrical control circuit suitable to regulate the heat treating machine. Power to operate the several electrically operated valves and the time delay relay of the heating circuit is provided by the low voltage lines 168 and 169. As noted earlier, the coiling machine 5 is operated continuously and includes a switching device which transmits electrical impulses to the control circuit to cause operation of the heat treating machine in time with the continuously operating coiling machine. In other words, each severed length of helical wire 4 is acted upon by the heat treating machine in step-wise fashion after it is advanced from the coiling machine to the heat treating machine.

Figure 20:
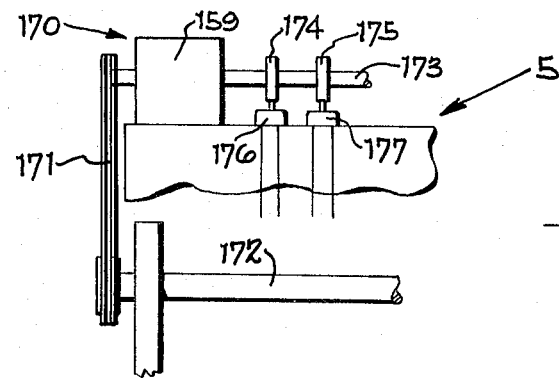
FIGURE 20 is a fragmentary view showing a portion of the coiler and illustrating, in a general way, the switching device which controls the cycles of operation of the heat treating machine in response to the continuously operating helical coiling machine.

The switching device of the coiling machine 5 is indicated generally at 170 in FIGURE 20 and may comprise a relatively small variable speed transmission 159 which is connected by a chain 171 to the main shaft 172 of the coiling machine 5. As noted earlier, this arrangement permits the coiling machine to be set up to produce helical wires of a selected length, adapting the timing speed of the switching device to be matched with the helical length, thereby to transmit the control signals in proper timing with the production of the helicals.

The variable speed switching device includes a cam shaft 173 having cams 174 and 175. These cams are arranged to close the normally open switches 176 and 177 upon each revolution of cam shaft 173, thereby to transmit two electrical impulses to the control system in time with the helical cut-off operation.

In the present example, the timing between the coiling machine and heat treating machine is such that two helical wires will have been fed into the heat treating machine while a third wire is being coiled. Thus, as shown in FIGURE 16, the helical D is shown advancing from the receiving section 6 to the indexing mechanism 7, while the previously formed helical E rests momentarily at the heat treating station, ready to be treated, with the electrodes 126 in the open or retracted position. It will be seen in FIGURE 16, that the previously treated helical F remains in the indexing mechanism while the helical G is being discharged by gravity to the chute 10, as indicated by the arrows.

At about the time a newly-formed helical D is severed by the coiling machine, the cam 174 of cam shaft 173 (rotating in the direction indicated by the arrow) will have reached the position shown in FIGURE 21, ready to close the switch 176 of line 178. This constitutes the first operation of the cycle.

When cam 174 closes switch 176, a circuit is established from line 168 by way of the line 178 through the electrically operated valve 180 and by way of line 179 to line 169. Valve 180 controls the operation of the horizontal indexing cylinder 100 (FIGURES 9 and 12). Upon being energized by line 178, valve 180 transmits air pressure by way of the supply line 181 through the valve 180 and by way of conduit 182 to the rearward end of cylinder 100, causing the piston rod 103 of cylinder 100 to shift from the retracted position of FIGURE 12 to the advanced position of FIGURE 9. This motion rotates the indexing shaft 67 in the direction indicated in FIGURE 9. The electrically operated valve 180 is of the double solenoid reversing type and is arranged to exhaust the air from the forward end of cylinder 100 by way of the conduit 183.

In the present example, the brake 111 of the indexing shaft 67 is disengaged by a brake release branch line 184 which is interconnected with the line 178. The circuit through the double solenoid, reversing brake valve 185 is completed by way of line 186. Thus, when the cam 174 closes switch 176 to actuate the indexing mechanism 7, the brake is released temporarily to permit rotation of the indexing mechanism. Air pressure is supplied to the brake control valve 185 by a supply conduit 187, such that air pressure is supplied by way of conduit 188 to the brake chamber 116 when the brake release line 184 is energized.

As the indexing piston rod 103 shifts to its extended position at completion of the indexing stroke (FIGURE 9), its trip bar 114 closes the switch 110 of the brake setting branch line 190. This causes air pressure to be advanced by way of supply conduit 187 and conduit 188 to the brake chamber, thus setting the brake at completion of the indexing stroke. The brake remains set until the next indexing cycle is initiated.

When the brake is set by operation of switch 110, the electrodes 126 are shifted to the closed position (FIGURE 15) by operation of the vertical electrode cylinder 127. The electrode cylinder 127 is controlled by a double solenoid reversing valve 191 having a supply conduit 192 and a pair of conduits 193 and 194 leading to the opposite ends of the vertical electrode cylinder 127. The electrode control valve 191 is shifted to the electrode closing position by a branch line 195 which is connected to the brake setting line 190. The circuit from the line 168 is completed through the electrode control valve 191 to line 169 by a branch line 196.

When the valve 191 is shifted to the electrode closing position, air pressure is supplied by the conduit 194 to the lower end of cylinder 127 so as to close the switch 166 of line 198, thereby to close switch 166 when the electrodes close (FIGURE 15). Line 198, upon being energized, reverses the position of index valve 180, so as to retract the piston rod 103 of cylinder 100 from the position of FIGURE 9 back to the position of FIGURE 12 to condition the mechanism for the next indexing stroke.

When the swinging indexing lever 92 returns to its retracted position (FIGURE 12), the cam 124 of lever 92 trips the switch 123. Switch 123 is interposed in a line 200 which includes a time delay relay 201 arranged to control the heat treating circuit. Thus, when switch 123 closes (with the indexing mechanism retracted, as in FIGURE 12) the contactor 202 of relay 201 closes a circuit in one of the power lines 203 leading to a power supply unit, indicated diagrammatically at 204. The power circuit is completed by the line 205.

The power unit 204 is a commercial structure including transformer windings for supplying electrical energy to the electrodes 126. When the power unit 204 is energized, electrical energy is transmitted to the power lines 206—206. These lines are connected with the electrodes 126 by the individual cables, previously indicated at 135 (FIGURES 19 and 21). It will be noted that the branch cables 135 provide individual circuits through the helical 4 between adjacent electrodes 126, such that the helical is heated to a uniform temperature throughout its entire length. After a predetermined period, relay 201 times out, thus deenergizing the power unit 204.

Immediately following the heat treating cycle, the cam 175 of the coiling machine closes its switch 177 which is interposed in a branch line 207. Branch line 207 energizes the electrode control valve 191 so as to apply air pressure by way of conduit 193 to the upper end of the vertical electrode cylinder 127, thereby to open the electrodes (FIGURE 16). The cycle is now complete and the machine idles momentarily until the cam 174 of the coiling machine trips its switch 176, thereby to initiate the next cycle by indexing a new helical to the electrode station.

Having described our invention we claim:

1. A heat treating machine for normalizing elongated workpieces such as helical wires or the like comprising, a receiving section adapted to receive said workpieces, a rotary indexing mechanism mounted relative to said receiving section, whereby said receiving section is adapted to deliver the said workpieces individually to the said indexing mechanism, said rotary indexing mechanism comprising an indexing shaft, a series of indexing wheels mounted on said shaft and spaced apart axially along the shaft from one another to provide a support engageable with the said elongated workpiece, a heat treating station mounted relative to said rotary indexing mechanism, said heat treating station comprising a plurality of electrodes mounted in alignment with the said indexing wheels of the indexing mechanism, said electrodes normally residing in a retracted position with respect to the said indexing wheels, said electrodes adapted to engage the elongated workpiece at points which are supported by the said indexing wheels, whereby the indexing wheels coact with the electrodes to support and clampingly engage the workpiece along the length thereof, said indexing wheels and said electrodes being electrically insulated, and means for applying electrical energy to said electrodes, whereby said electrodes heat the elongated workpiece to a normalizing temperature.

2. A heat treating machine for normalizing elongated workpieces such as helical wires or the like comprising,
- a receiving section adapted to receive the workpieces,
- a rotary indexing mechanism mounted relative to said receiving section, said receiving section adapted to deliver the said elongated workpieces individually to the said rotary indexing mechanism,
- a heat treating station mounted relative to said rotary indexing mechanism,
- said rotary indexing mechanism comprising an indexing shaft including a plurality of indexing wheels spaced axially from one another along said indexing shaft and adapted to receive and support the elongated workpiece which issues from the said receiving section,
- said indexing wheels being electrically insulated from one another along said indexing shaft,
- said rotary indexing mechanism adapted to deliver the workpieces individually to the heat treating station,
- said heat treating station comprising, a rock shaft mounted parallel with said indexing shaft,
- a plurality of electrodes mounted upon said rock shaft and insulated from one another, said electrodes being aligned individually with said indexing wheels, whereby an elongated workpiece supported by said indexing wheels is adapted to be clampingly engaged between the individual indexing wheels and electrodes,
- said electrodes adapted to reside in a retracted position with respect to the said indexing wheels, adapting the indexing wheels to be rotated in stepwise fashion from the said receiving section to the heat treating station,
- said rock shaft adapted to shift the said electrodes from said retracted position to an advanced position, whereby said electrodes clampingly engage the elongated workpiece at points which are supported by the indexing wheels,
- and means for applying electrical heating energy to said electrodes after the electrodes are shifted into clamping engagement with the elongated workpiece, thereby to heat the elongated workpiece to a normalizing temperature.

3. A heat treating machine for normalizing elongated workpieces such as helical wires comprising,
- a receiving section adapted to receive the workpieces,
- a rotary indexing mechanism mounted relative to said receiving section, said receiving section adapted to deliver the said elongated workpieces individually to the said rotary indexing mechanism,
- a heat treating station mounted relative to said rotary indexing mechanism,
- said rotary indexing mechanism comprising an indexing shaft including a plurality of indexing wheels spaced axially from one another along said indexing shaft and adapted to receive and support the elongated workpiece which issues from the said receiving section,
- said indexing wheels being electrically insulated from one another along said indexing shaft,
- said rotary indexing mechanism adapted to deliver the workpieces individually to the heat treating station,
- said heat treating station comprising, a rock shaft mounted parallel with said indexing shaft,
- a plurality of electrodes mounted upon said rock shaft and insulated from one another, said electrodes being aligned individually with said indexing wheels, whereby an elongated workpiece supported by said indexing wheels is adapted to be clampingly engaged between the individual indexing wheels and electrodes,
- said electrodes adapted to reside in a retracted position with respect to the said indexing wheels, adapting the indexing wheels to be rotated in stepwise fashion from the said receiving section to the heat treating station,
- power means for shifting said indexing shaft and indexing wheels from the receiving station to the heat treating station, whereby the elongated workpiece is transferred in stepwise fashion from the receiving section to the heat treating station,
- power means connected to the rock shaft of said heat treating station adapted to impart rocking motion to said rock shaft, thereby to shift the said electrodes from said retracted position to an advanced position, whereby said electrodes clampingly engage the elongated workpiece at points which are supported by the indexing wheels,
- and means for applying electrical heating energy to said electrodes after the electrodes are shifted into clamping engagement with the elongated workpiece, thereby to heat the elongated workpiece to a normalizing temperature.

4. A heat treating machine as set forth in claim 2 in which the electrodes are mounted for shifting motion relative to the said rock shaft and are spring biased relative to the rock shaft toward the indexing wheels, whereby said spring biased electrodes are adapted to shift relative to the workpiece supported by the indexing wheels upon motion of the rock shaft in a direction to engage the workpiece, said spring biased electrodes thereby providing a wiping action with respect to the workpiece to provide a positive electrical contact with the workpiece.

5. A heat treating machine as set forth in claim 4 in which the spring biased electrodes each include a portion which is pivotally mounted with respect to the rock shaft and whereby the rock shaft is adapted to rock downwardly beyond the point at which the electrodes contact the workpiece, whereby the electrodes shift in an arc about the pivotally mounted portion thereof to provide a wiping action with respect to the workpiece.

6. A heat treating machine as set forth in claim 1 in which the indexing shaft includes a brake element adapted to be engaged when the workpiece supported by the indexing wheels is engaged by the electrodes, thereby to resist the pressure imposed upon the workpiece by said electrode.

7. A heat treating machine as set forth in claim 1 in which the indexing shaft is provided with a ratchet, a pawl adapted to advance the ratchet in stepwise fashion, thereby to rotate said indexing shaft and indexing wheels in stepwise progression from the receiving section to the heat treating station, and means for reciprocating the pawl, thereby to impart the stepwise rotary motion to the ratchet.

8. A heat treating machine for normalizing elongated workpieces such as helical wires or the like, said heat treating machine adapted to operate in time with a handling mechanism which delivers an elongated workpiece upon each cycle of operation thereof, said heat treating machine comprising,
- a receiving section adapted to receive the said workpieces as the workpieces are delivered by said handling mechanism,
- a rotary indexing mechanism mounted relative to said receiving section, said receiving section adapted to deliver the said workpieces individually to the rotary indexing mechanism,
- a heat treating station mounted relative to said rotary indexing mechanism,
- said heat treating station comprising a rock shaft having a plurality of electrodes mounted thereon,
- said rock shaft normally residing in a retracted position clear of said indexing mechanism, adapting the indexing mechanism to advance the individual electrodes from the receiving section to a position to be engaged by said electrodes,
- a first power means connected to the rotary indexing mechanism adapted to rotate the same in stepwise fashion, thereby to advance the elongated workpieces from the receiving section to the heat treating station, a second power means connected to said rock shaft adapted to shift the rock shaft and the electrodes thereof from said retracted position into engagement with the elongated workpiece which is advanced by the indexing mechanism from the receiving section to the heat treating station, means for applying electrical heating energy to said electrodes after said electrodes are shifted from the retracted position into engagement with the elongated workpiece, and a control system including a switching device in driving connection with the said continuously operating handling mechanism, said switching device and control system adapted to transmit electrical impulses to the first and second power means of the indexing mechanism and heat treating station in time with one another, whereby the elongated workpiece is indexed and engaged by the electrodes in time with the operation of the handling mechanism.

9. A heat treating machine for normalizing elongated workpieces such as helical wires comprising:

a receiving section adapted to receive said elongated workpieces;

a rotary indexing mechanism mounted relative to said receiving section, said receiving section adapted to deliver said workpieces individually to the said rotary indexing mechansm;

said receiving section comprising a downwardly inclined plate having a length at least equal to the length of the elongated workpieces, said downwardly inclined plate having a series of deflectors projecting outwardly from the surface thereof, said deflectors being disposed generally in horizontal planes, said workpieces adapted to descend by gravity along said downwardly inclined plate, said deflectors adapted to retard the downward motion of the workpieces along the said downwardly inclined plate and adapted to feed the workpieces individually to the indexing mechanism;

a heat treating station mounted adjacent said indexing mechanism;

said rotary indexing mechanism adapted to advance in stepwise progression from the receiving section to the heat treating station, thereby to deliver the workpieces individually to the heat treating station;

said heat treating station including a plurality of shiftable electrodes adapted to reside in a retracted position during the stepwise advancement of the rotary indexing mechanism;

said electrodes adapted to be advanced from the retracted position to an advanced position engaging the workpiece upon the stepwise advancement of the rotary indexing mechanism from the receiving section to the heat treating station;

said rotary indexing mechanism coacting with said electrodes to support the workpiece upon engagement thereof by the said electrodes in the advanced position engaging the workpiece;

and means for applying electrical energy to the electrodes when the electrodes reside in said advanced position engaging the workpiece, thereby to heat treat the workpiece upon advancement thereof to the heat treating station.

10. A heat treating machine for normalizing elongated workpieces such as helical wires comprising:

a receiving section adapted to receive said elongated workpieces;

a rotary indexing mechanism mounted relative to said receiving section, said receiving section adapted to deliver said workpieces individually to the said rotary indexing mechanism;

said receiving section comprising a downwardly inclined plate having a length at least equal to the length of the elongated workpieces, said downwardly inclined plate having a series of deflectors projecting outwardly from the surface thereof;

said deflectors being disposed generally in horizontal planes, said workpieces adapted to descend by gravity along said downwardly inclined plate, said deflectors adapted to retard the downward motion of the workpieces along said downwardly inclined plate and adapted to feed the workpieces individually to the indexing mechanism;

a guard element disposed in a generally vertical plane and located outwardly from the downwardly inclined plate, said guard element adapted to coact with the downwardly inclined plate and to form a downwardly converging throat adapted to direct the workpieces in a positive manner into the indexing mechanism;

a heat treating station mounted adjacent said indexing mechanism;

said rotary indexing mechanism adapted to advance in stepwise progression from the receiving section to the heat treating station, thereby to deliver the workpieces individually to the heat treating station;

said heat treating station including a plurality of shiftable electrodes adapted to reside in a retracted position during the stepwise advancement of the rotary indexing mechanism;

said electrodes adapted to be advanced from the retracted position to an advanced position engaging the workpiece upon the stepwise advancement of the rotary indexing mechanism from the receiving section to the heat treating station;

said rotary indexing mechanism coacting with said electrodes to support the workpiece upon engagement thereof by the said electrodes in the advanced position engaging the workpiece;

and means for applying electrical energy to the electrodes when the electrodes reside in said advanced position engaging the workpiece, whereby to heat treat the workpiece upon advancement thereof to the heat treating station.

11. A heat treating machine for normalizing elongated workpieces such as helical wires comprising:

a receiving section adapted to receive said elongated workpieces;

a rotary indexing mechanism mounted relative to said receiving section, said receiving section adapted to deliver said workpieces individually to the said rotary indexing mechanism;

said receiving section comprising a downwardly inclined plate having a length at least equal to the length of the elongated workpieces;

said downwardly inclined plate having a series of deflectors projecting outwardly from the surface thereof, said deflectors being disposed generally in horizontal planes, said workpieces adapted to descend by gravity along said downwardly inclined plate, said deflectors adapted to retard the downward motion of the workpieces along the said downwardly inclined plate and adapted to feed the workpieces individually to the indexing mechanism;

said receiving section including opposed, downwardly inclined end guides adapted to engage the opposite ends of the workpiece as the workpiece descends by gravity along the downwardly inclined plate, thereby to align the workpiece axially with respect to the heat treating station;

a heat treating station mounted adjacent said indexing mechanism;

said rotary indexing mechanism adapted to advance in stepwise progression from the receiving section to the heat treating station, thereby to deliver the workpieces individually to the heat treating station;

said heat treating station including a plurality of shiftable electrodes adapted to reside in a retracted position during the stepwise advancement of the rotary indexing mechanism;

said electrodes adapted to be advanced from the retracted position to an advanced position engaging the workpiece upon the stepwise advancement of the rotary indexing mechanism from the receiving section to the heat treating station;

said rotary indexing mechanism coacting with said electrodes to support the workpiece upon engagement thereof by the said electrodes in the advanced position engaging the workpiece;

and means for applying electrical energy to the electrodes when the electrodes reside in said advanced position engaging the workpiece, thereby to heat treat the workpiece upon advancement thereof to the heat treating station.

12. A heating treating machine for normalizing elongated workpieces such as helical wires or the like, said heat treating machine adapted to operate in time with a handling mechanism which delivers an elongated workpiece individually upon each cycle of operation thereof, said heat treating machine comprising:

a receiving section adapted to receive the said workpieces as the workpieces are delivered by said handling mechanism;

a rotary indexing mechanism mounted relative to said receiving section, said receiving section adapted to deliver the said workpieces individually to the rotary indexing mechanism;

a heat treating station mounted relative to said rotary indexing mechanism;

said heat treating station comprising a plurality of electrodes normally residing in a retracted position clear of said indexing mechanism;

adapting the indexing mechanism to advance the individual workpieces from the receiving section to a position to be engaged by said electrodes;

a first power means connected to the rotary indexing mechanism adapted to rotate the same in stepwise fashion, thereby to advance the elongated workpieces from the receiving section to the heat treating station;

a second power means connected to said electrodes and adapted to shift the electrodes from the retracted position to an advanced position into engagement with the elongated workpiece which is advanced by the indexing mechanism to the heat treating station;

and a control system including a switching device in driving connection with the said handling mechanism;

said switching device and control system adapted to transmit electrical impulses to the first and second power means of the indexing mechanism and of the heating treating station in time with one another, whereby the elongated workpiece is indexed and engaged by the electrodes for heat treatment in time with the operation of the handling mechanism;

said control system adapted to apply electrical energy for a timed period to the electrodes when the electrodes are shifted into engagement with the workpiece;

said control system thereafter adapted to energize the second power means in a direction to shift the electrodes from said position in engagement with the workpiece back to said normally retracted position;

said control system thereafter adapted to energize the first power means in a direction to rotate the indexing mechanism in stepwise fashion to advance the heat treated workpiece from the heat treating station and to advance a successive workpiece to the heat treating station.

References Cited by the Examiner
UNITED STATES PATENTS

| | | | |
|---|---|---|---|
| 2,105,105 | 1/1938 | Zimmerman | 219—50 |
| 2,116,327 | 5/1938 | Simmons | 219—50 |
| 2,124,329 | 7/1938 | Zimmerman | 219—50 |
| 2,678,988 | 5/1954 | Nelson et al. | 219—50 |
| 2,678,989 | 5/1954 | Nelson et al. | 219—50 |

RICHARD M. WOOD, *Primary Examiner.*

B. A. STEIN, *Assistant Examiner.*